United States Patent
Sano et al.

(10) Patent No.: US 10,871,597 B2
(45) Date of Patent: Dec. 22, 2020

(54) POLARIZING PLATE, IMAGE DISPLAY DEVICE, AND POLARIZING PLATE PROTECTIVE FILM

(71) Applicant: FUJIFILM Corporation, Tokyo (JP)

(72) Inventors: Naoki Sano, Kanagawa (JP); Nobutaka Fukagawa, Kanagawa (JP); Akio Tamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 279 days.

(21) Appl. No.: 16/038,639

(22) Filed: Jul. 18, 2018

(65) Prior Publication Data
US 2018/0329117 A1  Nov. 15, 2018

Related U.S. Application Data

(63) Continuation of application No. PCT/JP2017/001537, filed on Jan. 18, 2017.

(30) Foreign Application Priority Data

Jan. 22, 2016  (JP) ................. 2016-010697

(51) Int. Cl.
| | |
|---|---|
| B32B 7/02 | (2019.01) |
| B32B 23/14 | (2006.01) |
| G02B 1/14 | (2015.01) |
| G02B 5/30 | (2006.01) |
| C08L 1/10 | (2006.01) |
| C08J 5/18 | (2006.01) |
| C08K 5/29 | (2006.01) |
| C08B 3/06 | (2006.01) |
| C08K 5/3462 | (2006.01) |

(52) U.S. Cl.
CPC ............... *G02B 1/14* (2015.01); *B32B 7/02* (2013.01); *B32B 23/14* (2013.01); *C08B 3/06* (2013.01); *C08J 5/18* (2013.01); *C08K 5/29* (2013.01); *C08K 5/3462* (2013.01); *C08L 1/10* (2013.01); *G02B 5/30* (2013.01); *C08J 2301/12* (2013.01)

(58) Field of Classification Search
None
See application file for complete search history.

(56) References Cited

U.S. PATENT DOCUMENTS

| | | | | |
|---|---|---|---|---|
| 2005/0073633 A1* | 4/2005 | Satake | ................ | G02B 5/30 349/113 |
| 2016/0048057 A1* | 2/2016 | Sekiguchi | .............. | G02B 5/305 349/61 |

FOREIGN PATENT DOCUMENTS

| | | |
|---|---|---|
| JP | H05-271471 A | 10/1993 |
| JP | H06-148430 A | 5/1994 |
| JP | 2005271471 A | 10/2005 |
| JP | 2006148430 A | 6/2006 |
| JP | 2006219615 A | 8/2006 |
| JP | 2008015413 A | 1/2008 |
| JP | WO2014098222 A1 | 6/2014 |
| JP | WO2015005398 A1 | 1/2015 |
| JP | 2016191722 A | 11/2016 |
| JP | 2007269941 A | 10/2017 |

OTHER PUBLICATIONS

Office Action issued by the Japanese Patent Office Action dated Jul. 23, 2019, in connection with corresponding Japanese Patent Application No. 2017-562847.
International Search Report issued in connection with International Patent Application No. PCT/JP2017/001537 dated Apr. 11, 2017.
International Preliminary Report on Patentability of Chapter II issued in connection with International Patent Application No. PCT/JP2017/001537 dated Oct. 30, 2017.

* cited by examiner

*Primary Examiner* — Sheeba Ahmed
(74) *Attorney, Agent, or Firm* — Edwards Neils LLC; Jean C. Edwards, Esq.

(57) ABSTRACT

Provided are a polarizing plate including a polarizer and a polarizing plate protective film laminated on the polarizer, in which the polarizing plate protective film contains at least one compound represented by any one of General Formulas (1) to (3) and cellulose acylate; an image display device using the polarizing plate; and a polarizing plate protective film used for the polarizing plate,

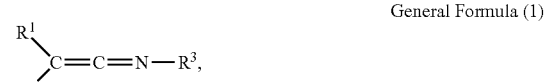

General Formula (1)

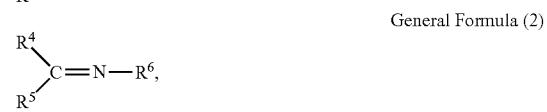

General Formula (2)

and

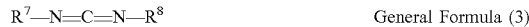

General Formula (3)

in which $R^1$ to $R^8$ represent a specific substituent.

10 Claims, 1 Drawing Sheet

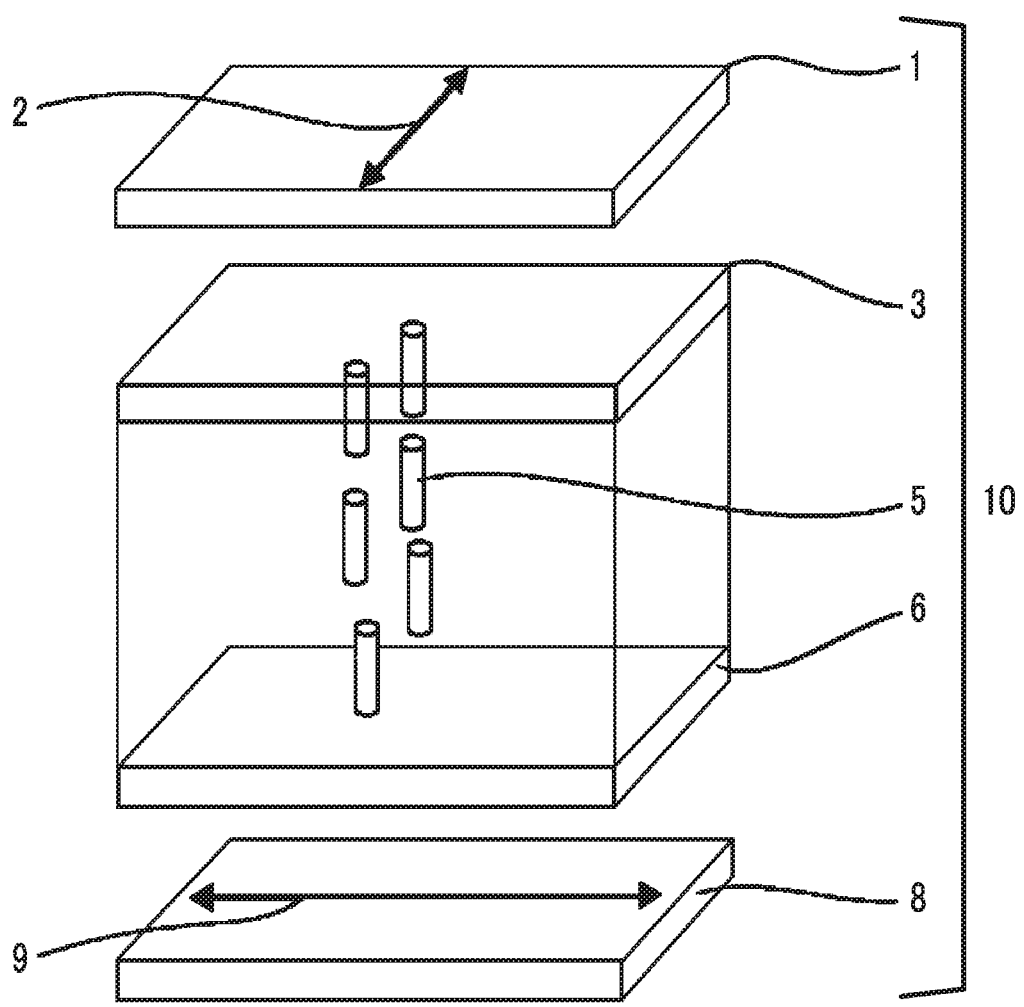

POLARIZING PLATE, IMAGE DISPLAY DEVICE, AND POLARIZING PLATE PROTECTIVE FILM

CROSS-REFERENCE TO RELATED APPLICATIONS

This application is a Continuation of PCT International Application No. PCT/JP2017/001537 filed on Jan. 18, 2017, which was published under PCT Article 21(2) in Japanese, and which claims priority under 35 U.S.C. § 119 (a) to Japanese Patent Application No. 2016-010697 filed in Japan on Jan. 22, 2016. The above applications are hereby expressly incorporated by reference, in their entirety, into the present application.

BACKGROUND OF THE INVENTION

1. Field of the Invention

The present invention relates to a cellulose ester film, a polarizing plate, and an image display device.

2. Description of the Related Art

An image display device represented by an electroluminescent (ELD), a liquid crystal display device (LCD), and the like as diversified use environments thereof including outdoor use and car use. In accordance with the diversified use environments, the image display device is required to have a performance (a high level of durability) capable of stably maintaining favorable image quality even under severe environments compared to that of the related art.

A polarizing plate used in the image display device includes a polarizer, and a protective film (polarizing plate protective film) provided on the polarizer surface. As the polarizing plate protective film, cellulose acylate has been in wide use from the viewpoints of versatility and workability, but the cellulose acylate is hydrolyzed under the presence of moisture, and therefore an acid is generated. The generated acid cleaves a main chain of the cellulose acylate or cleaves a crosslinked structure introduced into the polarizer, leading to cause a deterioration in the performance of the polarizing plate. In addition, the acid also causes yellowing (coloration) of the cellulose acylate.

In order to suppress such action of the acid, a technique of adding an epoxy compound as an acid trapping agent into a polarizing plate protective film has been proposed (for example, JP2007-269941A).

SUMMARY OF THE INVENTION

The inventors of the present invention have made extensive studies to suppress a deterioration of a polarizer under high-temperature high-humidity environments while assuming the diversified use environments of the image display device, and as a result, it became clear that in a case where a film in which an epoxy compound disclosed in JP2007-269941A is added to cellulose acylate is used as a polarizing plate protective film, optical properties of the polarizer cannot be sufficiently maintained under the severe environments of high temperature and high humidity.

An object of the present invention is to provide a polarizing plate which includes a cellulose acylate film as a protective film and in which a deterioration of a polarizer is unlikely to occur even under severe environments of high temperature and high humidity and excellent durability is exhibited, and an image display device including the polarizing plate. Another object of the present invention is to provide a polarizing plate protective film which is formed of a cellulose acylate film, in which cellulose acylate is unlikely to be decomposed even under the severe environments of high temperature and high humidity and yellowing of the film is unlikely to occur, and in which a deterioration of the polarizer under the severe environments is capable of being effectively suppressed.

As a result of extensive studies in view of the above problems, the inventors of the present invention have found that by providing a film durability improving agent having a specific structure in the cellulose acylate film, the decomposition of the cellulose acylate can be greatly suppressed even under the severe environments of high temperature and high humidity, and to satisfactorily suppress yellowing of the film. The inventors of the present invention have further found that in a case where the cellulose acylate film is used as the polarizing plate protective film, a deterioration (change in degree of polarization) in optical properties of the polarizer can be highly suppressed even under the severe environments of high temperature and high humidity.

The present invention has been completed based on the above findings.

The objects of the present invention were solved by the following means.

[1] A polarizing plate comprising: a polarizer; and a polarizing plate protective film laminated on the polarizer, in which the polarizing plate protective film contains at least one compound represented by any one of General Formulas (1) to (3), and cellulose acylate,

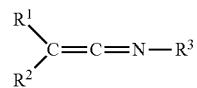

General Formula (1)

in General Formula (1), $R^1$ and $R^2$ represent an alkyl group, a cycloalkyl group, an aryl group, an acyl group, an alkoxy group, an aryl carbonyl group, or a carbamoyl group, and $R^3$ represents an alkyl group, a cycloalkyl group, or an aryl group,

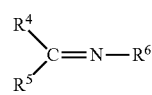

General Formula (2)

in General Formula (2), $R^4$ and $R^5$ represent an alkyl group, a cycloalkyl group, an aryl group, an acyl group, an alkoxy group, an aryl carbonyl group, or a carbamoyl group, and $R^6$ represents an alkyl group, a cycloalkyl group, or an aryl group, and

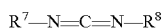

General Formula (3)

$R^7\text{—}N\text{=}C\text{=}N\text{—}R^8$ in General Formula (3), $R^7$ and $R^8$ represent an alkyl group, a cycloalkyl group, or an aryl group, provided that in each of General Formulas (1) to (3), a carbon atom and a nitrogen atom which are shown to be linked to each other by a double bond are not ring-constituting atoms of a monocyclic ring.

[2] The polarizing plate according to [1], in which in the polarizing plate protective film, a content of the compound represented by any one of General Formulas (1) to (3) is a total of 0.1 to 50 parts by mass with respect to 100 parts by mass of a content of the cellulose acylate.

[3] The polarizing plate according to [1] or [2], in which at least one of $R^1$, $R^2$, or $R^3$ of General Formula (1) is an aryl group, at least one of $R^4$, $R^5$, or $R^6$ of General Formula (2) is an aryl group, and at least one of $R^7$ or $R^8$ of General Formula (3) is an aryl group.

[4] The polarizing plate according to [3], in which at least two of $R^1$, $R^2$, or $R^3$ of General Formula (1) are aryl groups, at least two of $R^4$, $R^5$, or $R^6$ of General Formula (2) are aryl groups, and $R^7$ and $R^8$ of General Formula (3) are aryl groups.

[5] The polarizing plate according to [3] or [4], in which the aryl group is a phenyl group.

[6] The polarizing plate according to any one of [1] to [5], in which the compound represented by any one of General Formulas (1) to (3) has a molecular weight of 250 or more.

[7] The polarizing plate according to any one of [1] to [6], in which the polarizing plate protective film contains at least one compound represented by General Formula (A),

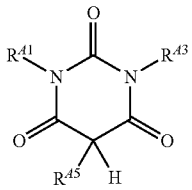

General Formula (A)

in General Formula (A), $R^{41}$ and $R^{43}$ represent a hydrogen atom, an alkyl group, a cycloalkyl group, an alkenyl group, or an aromatic group, and $R^{45}$ represents a hydrogen atom or a substituent.

[8] The polarizing plate according to any one of [1] to [7], in which the polarizing plate protective film contains at least one compound represented by General Formula (I) or (II),

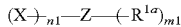

General Formula (I)

in General Formula (I), Z represents a benzene ring or a cyclohexane ring, X represents a group represented by General Formula (I-A-3), n1 is an integer of 2 to 6, $R^{1a}$ represents a substituent, and m1 is an integer of 0 to 4,

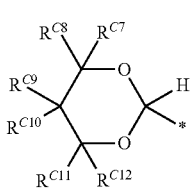

General Formula (I-A-3)

in General Formula (I-A-3), $R^{C7}$ to $R^{C12}$ represent a hydrogen atom, an alkyl group, a cycloalkyl group, an aryl group, an acyl group, an aryl carbonyl group, an alkoxy group, or an alkoxycarbonyl group, and * represents a bond, and

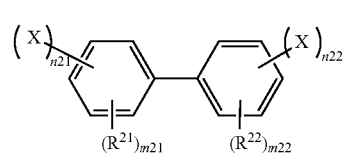

General Formula (II)

in General Formula (II), X has the same meaning as X in General Formula (I), n21 and n22 are integers of 1 to 5, $R^{21}$ and $R^{22}$ represent substituents, and m21 and m22 are integers of 0 to 4.

[9] An image display device comprising: the polarizing plate according to any one of [1] to [8].

[10] A polarizing plate protective film comprising: at least one compound represented by any one of General Formulas (1) to (3); and cellulose acylate,

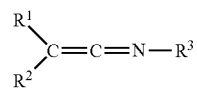

General Formula (1)

in General Formula (1), $R^1$ and $R^2$ represent an alkyl group, a cycloalkyl group, an aryl group, an acyl group, an alkoxy group, an aryl carbonyl group, or a carbamoyl group, and $R^3$ represents an alkyl group, a cycloalkyl group, or an aryl group,

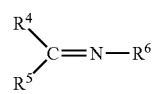

General Formula (2)

in General Formula (2), $R^4$ and $R^5$ represent an alkyl group, a cycloalkyl group, an aryl group, an acyl group, an alkoxy group, an aryl carbonyl group, or a carbamoyl group, and $R^6$ represents an alkyl group, a cycloalkyl group, or an aryl group, and

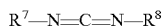

General Formula (3)

in General Formula (3), $R^7$ and $R^8$ represent an alkyl group, a cycloalkyl group, or an aryl group, provided that in each of General Formulas (1) to (3), a carbon atom and a nitrogen atom which are shown to be linked to each other by a double bond are not ring-constituting atoms of a monocyclic ring.

A numerical value range represented by "to" in the present specification, is a meaning including numerical values described before and after the range, as a lower limit value and an upper limit value.

In the present specification, a case where a plurality of substituents, linking groups, and the like denoted by specific symbols (hereinafter, will be referred to as substituents and the like) are present, or a case where the plurality of substituents and the like are defined at the same time or selectively defined, means that each of the substituents and the like may be respectively the same as or different from each other. The same applies to a case of defining the number of the substituents and the like. In addition, a case where the plurality of substituents and the like are in close vicinity to each other (particularly adjacent to each other)

means that the plurality of substituents and the like are linked to each other or condensed to each other so as to form a ring.

An expression of a compound in the present specification is used to indicate a meaning including a salt of the compound and an ion of the compound, in addition to the compound itself. In addition, the expression of a compound also includes a compound of which a part of a structure is changed to the extent that the effects of the objects are exerted.

In the present specification, a case where a substituent which is not clearly described as a substituted or an unsubstituted substituent (the same applies to a linking group), means that a group thereof may have an arbitrary substituent within a range that exerts a desired effect. The same applies to a compound which is not clearly described as a substituted or an unsubstituted compound.

In addition, in the present specification, a case where the term "substituent" is merely described, includes a group selected from the following substituent group T unless otherwise specified. In addition, in a case where a substituent having a specific range is merely described (for example, in a case where the term "alkyl group" is merely described), a preferable range in a group corresponding to the following substituent group T (in the above case, an alkyl group), and specific examples are applied.

In the present specification, in a case of defining the number of carbon atoms of a certain group, the number of carbon atoms means the number of carbon atoms of the whole group. That is, in a case where the group has a form of further having a substituent, the number of carbon atoms means the total number of carbon atoms including the substituent.

Substituent group T:

An alkyl group (preferably having 1 to 20 carbon atoms, more preferably 1 to 12 carbon atoms, and particularly preferably 1 to 8 carbon atoms, such as a methyl group, an ethyl group, an isopropyl group, a tert-butyl group, a n-octyl group, a n-decyl group, and a n-hexadecyl group); a cycloalkyl group (preferably having 3 to 20 carbon atoms, more preferably 3 to 12 carbon atoms, and particularly preferably 3 to 8 carbon atoms, such as a cyclopropyl group, a cyclopentyl group, and a cyclohexyl group); an alkenyl group (preferably having 2 to 20 carbon atoms, more preferably 2 to 12 carbon atoms, and particularly preferably 2 to 8 carbon atoms, such as a vinyl group, an allyl group, a 2-butenyl group, and a 3-pentenyl group); an alkynyl group (preferably having 2 to 20 carbon atoms, more preferably 2 to 12 carbon atoms, and particularly preferably 2 to 8 carbon atoms, such as a propargyl group and a 3-pentynyl group); an aryl group (preferably having 6 to 30 carbon atoms, more preferably 6 to 20 carbon atoms, and particularly preferably 6 to 12 carbon atoms, such as a phenyl group, a biphenyl group, and a naphthyl group); an amino group (preferably having 0 to 20 carbon atoms, more preferably 0 to 10 carbon atoms, and particularly preferably 0 to 6 carbon atoms, such as an amino group, a methylamino group, a dimethylamino group, a diethylamino group, and a dibenzylamino group); an alkoxy group (preferably having 1 to 20 carbon atoms, more preferably 1 to 12 carbon atoms, and particularly preferably 1 to 8 carbon atoms, such as a methoxy group, an ethoxy group, and a butoxy group); an aryloxy group (preferably having 6 to 20 carbon atoms, more preferably 6 to 16 carbon atoms, and particularly preferably 6 to 12, such as a phenyloxy group and a 2-naphthyloxy group); an acyl group (preferably having 1 to 20 carbon atoms, more preferably 1 to 16 carbon atoms, and particularly preferably 1 to 12 carbon atoms, such as an acetyl group, a formyl group, and a pivaloyl group); an arylcarbonyl group (preferably having 7 to 20 carbon atoms, more preferably 7 to 15 carbon atoms, and still more preferably 7 to 12 carbon atoms, such as a benzoyl group); an alkoxycarbonyl group (preferably having 2 to 20 carbon atoms, more preferably 2 to 16 carbon atoms, and particularly preferably 2 to 12 carbon atoms, such as a methoxycarbonyl group and an ethoxycarbonyl group); an aryloxycarbonyl group (preferably having 7 to 20 carbon atoms, more preferably 7 to 16 carbon atoms, and particularly preferably 7 to 10 carbon atoms, such as a phenyloxy carbonyl group); an acyloxy group (preferably having 2 to 20 carbon atoms, more preferably 2 to 16 carbon atoms, and particularly preferably 2 to 10 carbon atoms, such as an acetoxy group and a benzoyloxy group); an acylamino group (preferably having 2 to 20 carbon atoms, more preferably 2 to 16 carbon atoms, and particularly preferably 2 to 10 carbon atoms, such as an acetylamino group and a benzoylamino group); an allcoxycarbonylamino group (preferably having 2 to 20 carbon atoms, more preferably 2 to 16 carbon atoms, and particularly preferably 2 to 12 carbon atoms, such as a methoxycarbonyl amino group); an aryloxycarbonylamino group (preferably having 7 to 20 carbon atoms, more preferably 7 to 16 carbon atoms, and particularly preferably 7 to 12, such as a phenyloxycarbonylamino group); a sulfonylamino group (preferably having 1 to 20 carbon atoms, more preferably 1 to 16 carbon atoms, and particularly preferably 1 to 12 carbon atoms, such as a methanesulfonylamino group and a benzenesulfonylamino group); a sulfamoyl group (preferably having 0 to 20 carbon atoms, more preferably 0 to 16 carbon atoms, and particularly preferably 0 to 12 carbon atoms, such as a sulfamoyl group, a methylsulfamoyl group, a dimethylsulfamoyl group, and a phenylsulfamoyl group); a carbamoyl group (preferably having 1 to 20 carbon atoms, more preferably 1 to 16 carbon atoms, and particularly preferably 1 to 12 carbon atoms, such as a carbamoyl group, a methylcarbamoyl group, a diethylcarbamoyl group, and a phenylcarbamoyl group); an alkylthio group (preferably having 1 to 20 carbon atoms, more preferably 1 to 16 carbon atoms, and particularly preferably 1 to 12 carbon atoms, such as a methylthio group and an ethylthio group); an arylthio group (preferably having 6 to 20 carbon atoms, more preferably 6 to 16 carbon atoms, and particularly preferably 6 to 12 carbon atoms, such as a phenylthio group); a sulfonyl group (preferably having 1 to 20 carbon atoms, more preferably 1 to 16 carbon atoms, and particularly preferably 1 to 12. carbon atoms, such as a mesyl group and a tosyl group); a sulfinyl group (preferably having 1 to 20 carbon atoms, more preferably 1 to 16 carbon atoms, and particularly preferably 1 to 12 carbon atoms, such as a methanesulfinyl group and a benzenesulfinyl group); a urethane group and a ureido group (preferably having 1 to 20 carbon atoms, more preferably 1 to 16 carbon atoms, and particularly preferably 1 to 12 carbon atoms, such as a ureido group, a rnethylureido group, and a phenylureido group); a phosphoric acid amide group (preferably having 1 to 20 carbon atoms, more preferably 1 to 16 carbon atoms, and particularly preferably 1 to 12 carbon atoms, such as diethyl phosphoric acid amide and phenyl phosphoric acid amide); a hydroxyl group, a mercapto group, and a halogen atom (such as a fluorine atom, a chlorine atom, a bromine atom, and an iodine atom); a cyano group, a sulfo group, a carboxyl group, a nitro group, a hydroxamic acid group, a sulfino group, a hydrazino group, an imino group, a heterocyclic group (preferably having 1 to 30 carbon atoms, more preferably 1 to 12 carbon atoms, and examples of a hetero atom include a nitrogen atom, an oxygen atom, and a sulfur atom, and specific examples thereof include an imidazolyl group, a pyridyl group, a quinolyl group, a furyl group, a piperidyl group, a morpholino group, a benzoxazolyl group, a benzimidazolyl group, a benzthiazolyl group, and the like); and a silyl group (preferably having 3 to 40 carbon atoms, more preferably 3 to 30 carbon atoms, and particularly preferably 3 to 24 carbon atoms, such as a trimethylsilyl group, and a triphenylsilyl group).

These substituents may further have substituents. In addition, in a case where two or more substituents are present, the substituents may be the same as or different from each other. In addition, adjacent substituents may be bonded to each other so as to form a ring.

The polarizing plate and the image display device of the present invention exhibit excellent durability even under severe environments of high temperature and high humidity. Furthermore, the polarizing plate protective film of the present invention is unlikely to be decomposed even under severe environments of high temperature and high humidity and yellowing is unlikely to occur.

The characteristics and advantages described above and other characteristics and advantages of the present invention may be shown more clearly according to the following descriptions with reference to the suitably accompanying drawings.

BRIEF DESCRIPTION OF THE DRAWINGS

FIG. 1 is a schematic diagram showing an outline of a liquid crystal display device including a polarizing plate of the present invention.

DESCRIPTION OF THE PREFERRED EMBODIMENTS

Preferred embodiments of the present invention will be described below.

Polarizing Plate Protective Film

The polarizing plate of the present invention includes a polarizing plate protective film as a protective film of a polarizer. The polarizing plate protective film used in the present invention (hereinafter also will be referred to as the polarizing plate protective film of the present invention) contains cellulose acylate as a main component. The content of the cellulose acylate in the polarizing plate protective film of the present invention is preferably 50% by mass or more, more preferably 60% by mass or more, still more preferably 70% by mass or more, still more preferably 80% by mass or more, and still more preferably 85% by mass or more. An upper limit of the content of cellulose acylate in the polarizing plate protective film is generally 99% by mass or less, preferably 98% by mass or less, and more preferably 96% by mass or less. A remainder other than cellulose acylate in the polarizing plate protective film includes a film durability improving agent to be described later and as necessary, further includes a barbituric acid compound, an acetal compound, and other generally used additives to be described later.

Cellulose

In the present invention, as cellulose to be used as a raw cellulose acylate used in the polarizing plate protective film, there are cotton linters and wood pulp (hardwood pulp or softwood pulp), and cellulose obtained from any raw material cellulose can be used and a mixture thereof may be used. As the raw material cellulose, cellulose disclosed in "Lectures on Plastic Materials (17) Cellulose Resins" written by Marusawa and Uda, published by Nikkan Kogyo Shimbun, Ltd. in 1970, or Japan Institute of Invention and Innovation's Disclosure Bulletin 2001-1745 (pp. 7-8) can be used.

Cellulose Acylate

As the above cellulose acylate, known cellulose acylate used for manufacturing polarizing plate protective film can be used without any limitation.

A glucose unit bonded to β-1,4 configuring cellulose has free hydroxyl groups at second, third, and sixth positions. The cellulose acylate is a polymer obtained by acylating parts of these hydroxyl groups with acyl groups.

An acyl substitution degree (hereinafter will simply be referred to as "substitution degree") is a degree of the acylation of the hydroxyl groups in cellulose located at the second, third, and sixth positions, and in a case where the hydroxyl groups at the second, third, and sixth positions of all the glucose units are all acylated, the total acyl substitution degree is 3. For example, in a case in which only the sixth positions of all the glucose units are all acylated, the total acyl substitution degree is 1. In the same manner as described above, even in a case where any one of the sixth and second positions of the respective glucose units are all acylated in all the hydroxyl groups in all glucose, the total acyl substitution degree is 1.

That is, the substitution degree indicates a degree of acylation with a case where all the hydroxyl groups in glucose molecules are all acylated, as 3.

A substitution degree of cellulose acylate can be measured by a method disclosed in Tetsuka et. al., Carbohydrate. Res., 273, 83-91 (1995) or according to a method based on ASTM-D817-96.

The total acyl substitution degree of the cellulose acylate used in the present invention is preferably 1.50 to 3.00, more preferably 2.00 to 2.97, still more preferably 2.30 or more and less than 2.97, and particularly preferably 2.30 to 2.95.

An acyl group of the cellulose acylate used in the present invention is not particularly limited and may be a form having one acyl group or may be a form of carrying two or more acyl groups. The cellulose acylate used in the present invention preferably includes an acyl group having two or more carbon atoms as a substituent. The acyl group having two or more carbon atoms is not particularly limited, and may be an aliphatic acyl group, or may be an aromatic acyl group. Specific examples of the acyl group having two or more carbon atoms include acetyl, propionyl, butanoyl, heptanoyl, hexanoyl, octanoyl, decanoyl, dodecanoyl, tridecanoyl, tetradecanoyl, hexadecanoyl, octadecanoyl, isobutanoyl, tert-butanoyl, cyclohexanecarbonyl, oleoyl, benzoyl, naphthylcarbonyl, and cinnamoyl. Among these, acetyl, propionyl, butanoyl, dodecanoyl, octadecanoyl, tert-butanoyl, oleoyl, benzoyl, naphthylcarbonyl, and cinnamoyl are preferable, and acetyl, propionyl, and butanoyl are more preferable.

Cellulose acetate using only an acetyl group as an acyl group of cellulose acylate can be suitably used in the present invention, and the total acyl substitution degree of this cellulose acetate is preferably 2.00 to 3.00, more preferably 2.20 to 3.00, still more preferably 2.30 to 3.00, still more preferably 2.30 to 2.97, and particularly preferably 2.30 to 2.95.

Mixed fatty acid esters having two or more acyl groups can also be preferably used in the present invention as the cellulose acylate. In addition, a mixed acid ester having a fatty acid acyl group and a substituted or unsubstituted aromatic acyl group disclosed in paragraphs 002.3 to 0038 of JP2008-20896A can also be preferably used in the present invention. Among these, the acyl group of the mixed fatty acid ester preferably contains an acetyl group and an acyl group having 3 to 4 carbon atoms. In addition, in a case where the mixed fatty acid ester contains an acetyl group as an acyl group, the acetyl substitution degree thereof is preferably less than 2.5 and more preferably less than 1.9. On the other hand, in a case of containing an acyl group having 3 to 4 carbon atoms, the substitution degree of the acyl group having 3 to 4 carbon atoms is preferably 0.1 to 1.5, more preferably 0.2 to 1.2, and particularly preferably 0.5 to 1.1.

As the polarizing plate protective film of the present invention, it is also preferable to adopt a film composed of a plurality of layers containing different cellulose acylates by a co-casting method to be described later or the like.

The degree of polymerization of the cellulose acylate used in the present invention is preferably 250 to 800, and more preferably 300 to 600. In addition, the number average molecular weight of the cellulose ester and cellulose acylate used in the present invention is preferably 40,000 to 230,000, more preferably 60,000 to 230,000, and most preferably 75,000 to 200,000. The degree of polymerization can be obtained by dividing a number average molecular weight measured in terms of polystyrene by gel permeation chromatography (GPC) by a molecular weight of a glucopyranose unit of cellulose ester and cellulose acylate.

A number average molecular weight measured by gel permeation chromatography (GPC) in terms of polystyrene is adopted as a number average molecular weight. Specific measurement conditions are as follows.

GPC apparatus: GPC apparatus manufactured by TOSOH CORPORATION (HLC-8320GPC, Ecosec)

Column: TSKgel Super HZM-H, TSKgel Super HZ4000, and TSKgel Super HZ2000 combined (manufactured by TOSOH CORPORATION, 4.6 mm ID (inner diameter)× 15.0 cm)

Eluent: N-methylpyrrolidone (NMP)

The cellulose acylate used in the present invention can be synthesized by a general method. For example, the cellulose acylate can be synthesized using an acid anhydride or an acid chloride as an acylating agent. In a case where the acylating agent is an acid anhydride, an organic acid (for example, acetic acid) or methylene chloride is used as a reaction solvent. in addition, as a catalyst, a erotic catalyst such as sulfuric acid can be used. In a case where the acylating agent is an acid chloride, a basic compound can be used as a catalyst. In general industrial production of cellulose acylate, a hydroxyl group of the cellulose acylate is esterified by using an organic acid (acetic acid, propionic acid, butyric acid, and the like) corresponding to an intended acyl group or an acid anhydride thereof (acetic anhydride, propionic anhydride, butyric anhydride, and the like).

For example, cellulose derived from cotton linter or wood pulp as a raw material is subjected to an activating treatment with an organic acid such as acetic acid, and then is esterified with an organic acid having a desired structure in the presence of a sulfuric acid catalyst, and therefore cellulose acylate can be obtained. In addition, in a case where an organic acid anhydride is used as an acylating agent, an excessive amount of the organic acid anhydride is generally used with respect to an amount of the hydroxyl group present in the cellulose so as to esterify the cellulose.

Furthermore, cellulose acylate can also be synthesized by the method described in, for example, JP1998-45804A (JP-H10-45804A).

In addition to cellulose acylate, another resin (for example, (meth)acrylic resin or the like) may be used in combination in the polarizing plate protective film of the present invention, within a range of not impairing the effect of the present invention. The content of the other resin in the polarizing plate protective film of the present invention is preferably 40% by mass or less, more preferably 30% by mass or less, still more preferably 20% by mass or less, still more preferably 15% by mass or less, and still more preferably 10% by mass.

Film Durability Improving Agent

The polarizing plate protective film of the present invention contains at least one compound represented by any one of General Formulas (1) to (3) as a film durability improving agent.

General Formula (1)

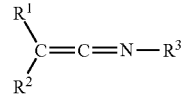

In General Formula (1), $R^1$ and $R^2$ represent an alkyl group, a cycloalkyl group, an aryl group, an acyl group, an alkoxy group, an aryl carbonyl group, or a carbamoyl group.

Alkyl groups which can be adopted as $R^1$ and $R^2$ may be linear or branched. The number of carbon atoms in the alkyl group is preferably 1 to 20, more preferably 1 to 10, still more preferably 1 to 8, still more preferably 1 to 6, and still more preferably 1 to 4. Preferred specific examples of this alkyl group include methyl, ethyl, propyl, isopropyl, n-butyl, t-butyl, s-butyl, and isobutyl.

The number of carbon atoms in the cycloalkyl group which can be adopted as $R^1$ and $R^2$ preferably is 3 to 20, more preferably 3 to 12, and still more preferably 3 to 8. Preferable specific examples of the cycloalkyl group include cyclopropyl, cyclopentyl, and cyclohexyl.

The number of carbon atoms in the aryl group which can be adopted as $R^1$ and $R^2$ is preferably 6 to 20, more preferably 6 to 15, and still more preferably 6 to 12. Preferable specific examples of the aryl group include phenyl and naphthyl.

The number of carbon atoms in the acyl group which can be adopted as $R^1$ and $R^2$ is preferably 2 to 20, more preferably 2 to 10, still more preferably 2 to 8, still more preferably 2 to 6, and still more preferably 2 to 4. Specific examples of the acyl group include acetyl, pivaloyl, and cyclohexylcarbonyl. In the present invention, the arylcarbonyl group is not included in the acyl group.

Alkoxy groups which can be adopted as $R^1$ and $R^2$ may be linear or branched. The number of carbon atoms in the alkoxy group is preferably 1 to 20, more preferably 1 to 10, still more preferably 1 to 8, still more preferably 1 to 6, and still more preferably 1 to 4. Preferable specific examples of the alkoxy group include methoxy, ethoxy, isopropoxy, n-butoxy, t-butoxy, pentoxy, hexoxy, heptoxy, and octoxy.

The number of carbon atoms in the arylcarbonyl group which can be adopted as $R^1$ and $R^2$ is preferably 7 to 20, more preferably 7 to 15, and still more preferably 7 to 12.

Preferable specific examples of the arylcarbonyl group include benzoyl and naphthyl.

The number of carbon atoms in the carbamoyl group which can be adopted as $R^1$ and $R^2$ is preferably 1 to 20, more preferably 1 to 16, still more preferably 1 to 12, and still more preferably from 1 to 8. Preferable specific examples of the carbamoyl group include N,N-dimethylcarbamoyl, N-cyclohexylcarbamoyl, and N-phenylcarbamoyl.

$R^3$ represents an alkyl group, a cycloalkyl group, or an aryl group. The alkyl group, the cycloalkyl group, and the aryl group which can be adopted as $R^3$ are synonymous with the alkyl group, the cycloalkyl group, and the aryl group which can be adopted as $R^1$ described above, respectively, and preferable aspects thereof are also the same.

In the compound represented by General formula (1), it is preferable that at least one of $R^1$, $R^2$, or $R^3$ is an aryl group (preferably a phenyl group), it is more preferable that at least two of $R^1$, $R^2$, or $R^3$ are an aryl group (preferably a phenyl group), and it is still more preferable that all of $R^1$, $R^2$, and $R^3$ are aryl groups (preferably phenyl groups).

In General Formula (1), a carbon atom and a nitrogen atom which are shown to be linked to each other by a double bond (that is, a carbon atom and a nitrogen atom in the "C=N" structure) are not ring-constituting atoms of a monocyclic ring. That is, in General Formula (1), in a case where $R^1$, $R^2$, and $R^3$ are groups not containing a cyclic structure, a form in which $R^1$ and $R^3$, or $R^2$, and $R^3$ may be linked to each other so as to form a ring is not contained in General Formula (1).

It is presumed that the compound of General Formula (1) supplements an acid as a film durability improving agent. The mechanism for trapping an acid is shown below as a reaction formula, but this mechanism is presumptive, and the present invention is not limited to such an acid trapping mechanism.

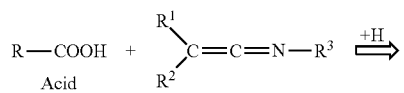

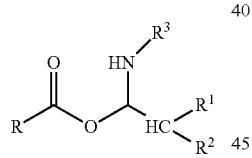

Preferable specific examples of the compound represented by General Formula (1) are shown below, but the present invention is not limited to these examples. In the following specific examples, the symbol * indicates a linking site. n indicates a number of 1 to 1,000. Et represents ethyl and Me represents methyl.

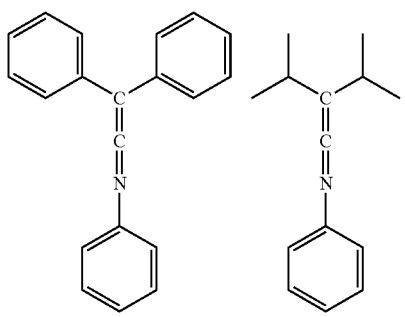

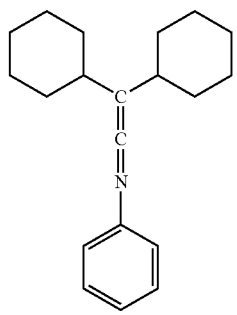

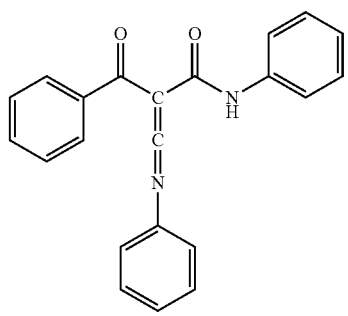

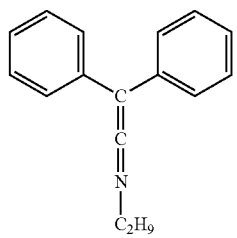

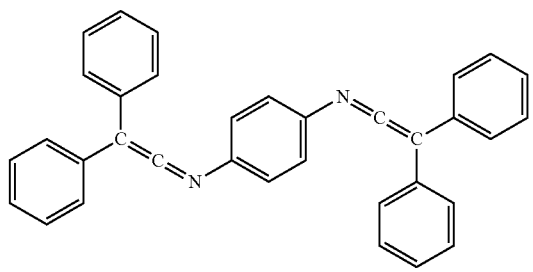

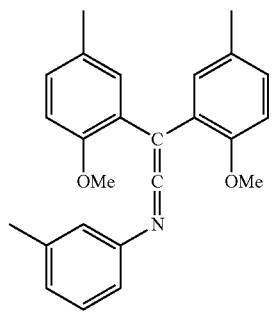

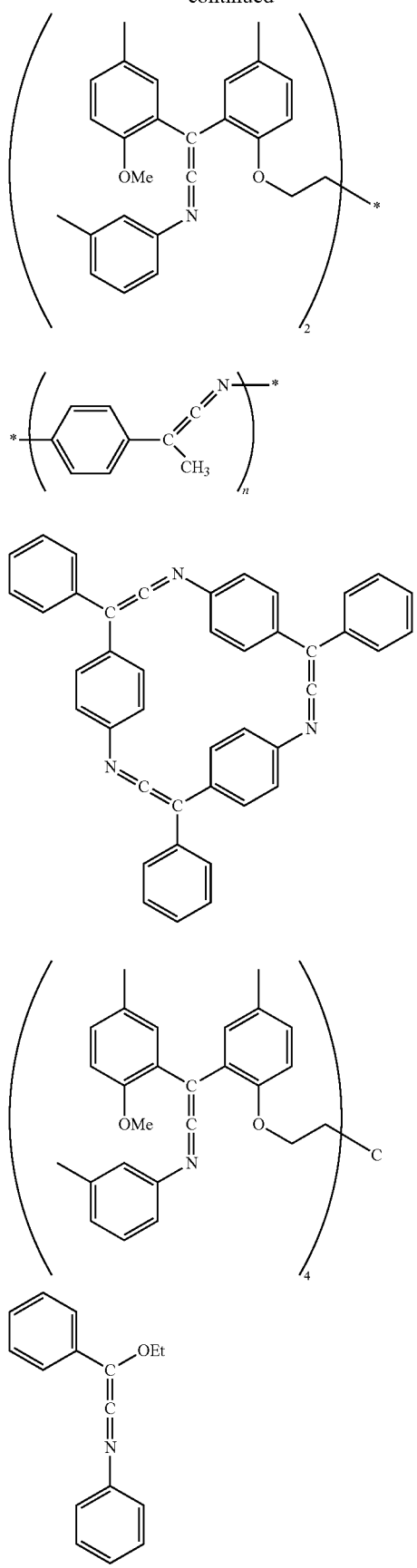

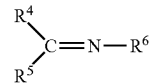

General Formula (2)

In General Formula (2), $R^4$ and $R^5$ represent an alkyl group, a cycloalkyl group, an aryl group, an acyl group, an alkoxy group, an aryl carbonyl group or a carbamoyl group.

Preferred forms of an alkyl group, a cycloalkyl group, an aryl group, an acyl group, an alkoxy group, an arylcarbonyl group, and a carbamoyl group which can be adopted as $R^4$ and $R^5$ are respectively the same as the preferred forms of an alkyl group, a cycloalkyl group, an aryl group, an acyl group, an alkoxy group, an arylcarbonyl group, and a carbamoyl group which can be adopted as $R^1$ in General Formula (1).

$R^6$ represents an alkyl group, a cycloalkyl group, or an aryl group. Preferred forms of an alkyl group, a cycloalkyl group, and an aryl group which can be adopted as $R^6$ are respectively the same as the preferred forms of an alkyl group, a cycloalkyl group, and an aryl group which can be adopted as $R^3$ in General Formula (1).

In the compound represented by General Formula (2), it is preferable that at least one of $R^4$, $R^5$, or $R^6$ is an aryl group (preferably a phenyl group), and at least two of $R^4$, $R^5$, or $R^6$ are an aryl group (preferably a phenyl group).

In General Formula (2), a carbon atom and a nitrogen atom which are shown to be linked to each other by a double bond are not ring-constituting atoms of a monocyclic ring. That is, in General Formula (2), in a case where $R^4$, $R^5$, and $R^6$ are groups not containing a cyclic structure, a form in which $R^4$ and $R^6$, or $R^5$ and $R^6$ may be linked to each other so as to form a ring is not contained in General Formula (2).

It is presumed that the compound of General Formula (2) traps an acid as a film durability improving agent. The mechanism for trapping an acid is shown below as a reaction formula, but this mechanism is presumptive, and the present invention is not limited to such an acid trapping mechanism.

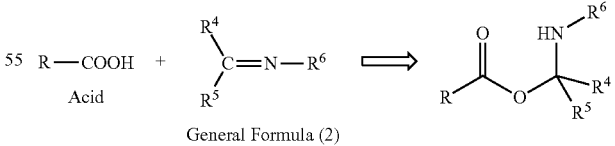

General Formula (2)

Preferable specific examples of the compound represented by General Formula (2) are shown below, but the present invention is not limited to these examples. In the following specific examples, the symbol * indicates a linking site. n indicates a number of 1 to 1,000. Et represents ethyl and Me represents methyl.

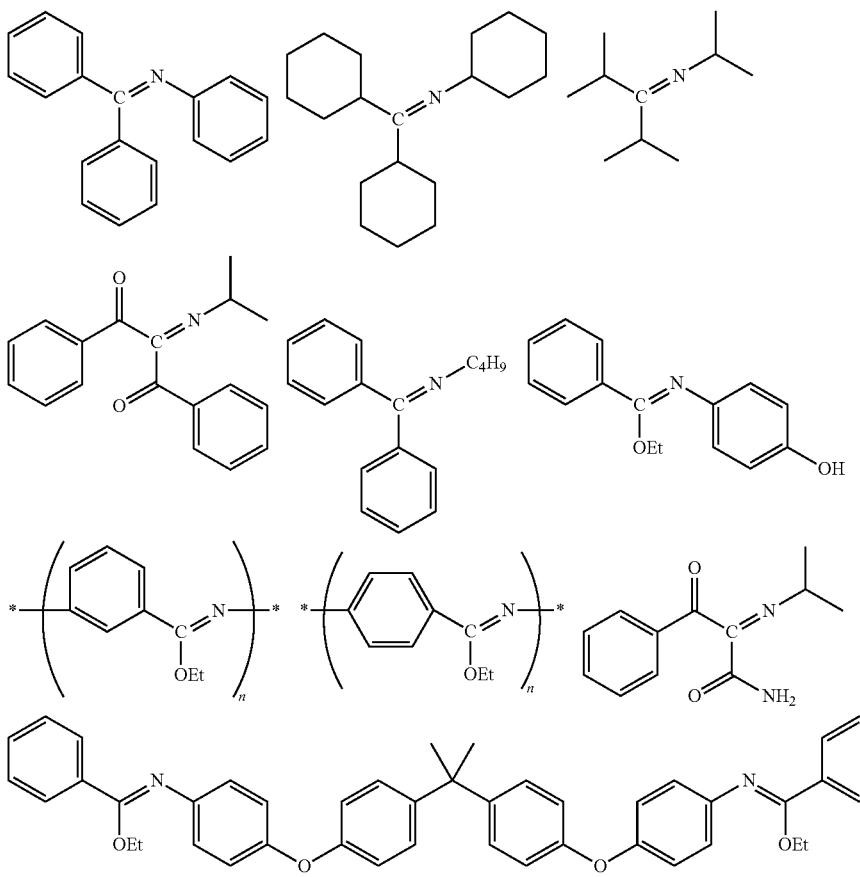

R[7]—N=C=N—R[8]    General Formula (3)

In General Formula (3), R[7] and R[8] represent an alkyl group, a cycloalkyl group, or an aryl group. Preferred forms of an alkyl group, a cycloalkyl group, and an aryl group which can be adopted as R[7] and R[8] are respectively the same as the preferred forms of an alkyl group, a cycloalkyl group, and an aryl group which can be adopted as R[3] in General Formula (1).

In the compound represented by General Formula (3), it is preferable that at least one of R[7] or R[8] is an aryl group (preferably a phenyl group), and R[7] and R[8] are an aryl group (preferably a phenyl group).

In General Formula (3), a carbon atom and a nitrogen atom which are shown to be linked to each other by a double bond are not ring-constituting atoms of a monocyclic ring. That is, in General Formula (3), in a case where R[7] and R[8] are groups not containing a cyclic structure, a form in which R[7] and R[8] may be linked to each other so as to form a ring is not contained in General Formula (3).

It is presumed that the compound of General Formula (3) supplements an acid as a fun durability improving agent. The mechanism for trapping an acid is shown below as a reaction formula, but this mechanism is presumptive, and the present invention is not limited to such an acid trapping mechanism.

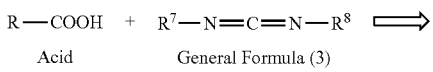

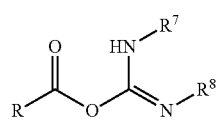

Preferable specific examples of the compound represented by General Formula (3) are shown below, but the present invention is not limited to these examples. In the following specific examples, the symbol * indicates a linking site. n indicates a number of 1 to 1,000.

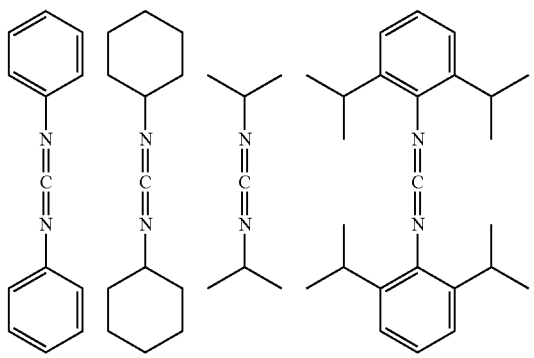

-continued

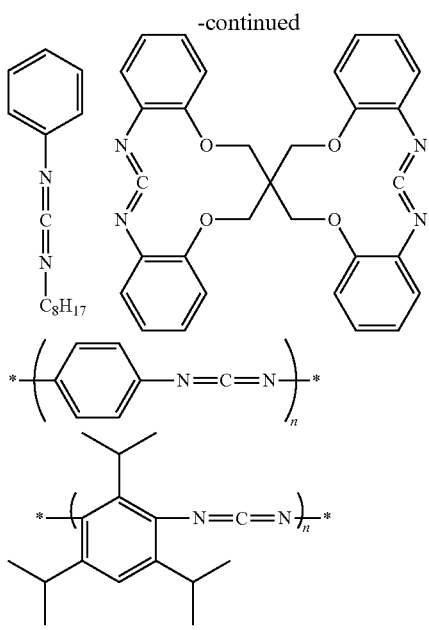

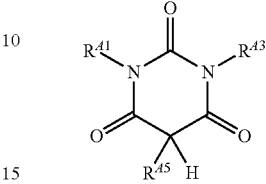

A molecular weight of each of the compounds represented by each of General Formulas (1) to (3) is not particularly limited. In consideration of volatilization during film formation, the molecular weight is preferably 100 or more, preferably 150 or more, more preferably 200 or more, and still more preferably 250 or more. An upper limit of the molecular weight of the compounds represented by each of General Formulas (1) to (3) is not particularly limited and is generally 1,000,000 or less, preferably 300,000 or less, and more preferably 100,000 or less. In addition, the molecular weight of the compounds represented by each of General Formulas (1) to (3) may be 10,000 or less, may be 8,000 or less, and may be 6,000 or less. In regard to the compound having the molecular weight of 1,000 or more, the molecular weight is a value as a weight-average molecular weight. A weight-average molecular weight can be measured under the following conditions using high-performance liquid chromatography.

Measurement Condition

Solvent: THF special grade (Tokyo Chemical Industry Co., Ltd.)
Column: TSKgel Super HZM-H, HZ4000, and HZ2000 (manufactured by TOSOH CORPORATION)
Sample Concentration: 0.1% by mass
Detector: RI MODEL 504 (manufactured by GL Sciences Inc.)
Flow Rate: 10 mL/min
Calibration Curve: STK standard polystyrene (Mw=500 to 1,000,000, manufactured by TOSOH CORPORATION)
Column Temperature: 40° C.

In the polarizing plate protective film of the present invention, the content of the compounds represented by any one of General Formulas (1) to (3) is preferably 0.1 to 50 parts by mass, more preferably 0.1 to 30 parts by mass, still more preferably 0.1 to 20 parts by mass, and still more preferably 0.1 to 10 parts by mass in total, with respect to the content of 100 parts by mass of cellulose acylate.

Barbituric Acid Compound

The polarizing plate protective film of the present invention preferably contains at least one barbituric acid compound represented by General Formula (A). The polarizing plate protective film of the present invention contains the compound represented by General Formula (A), and therefore a degradation of the polarizer due to heat or moist heat can be suppressed more effectively.

General Formula (A)

$$\underset{R^{45}\ H}{\overset{\displaystyle R^{41}\underset{\displaystyle O}{\overset{\displaystyle O}{\diagdown}}N\underset{\displaystyle O}{\overset{\displaystyle O}{\diagdown}}N-R^{43}}{}}$$

In General Formula (A), $R^{41}$ and $R^{43}$ represent a hydrogen atom, an alkyl group, a cycloalkyl group, an alkenyl group, or an aromatic group. An alkyl group, a cycloalkyl group, an alkenyl group, or an aromatic group may include a substituent. $R^{45}$ represents a hydrogen atom or a substituent.

The compound represented by General Formula (A) includes a tautomer having a structure in which a hydrogen atom in a ring structure is enolized with carbonyl in the adjacent ring structure or is imide-oxidized in a case where $R^{41}$ and $R^{43}$ are hydrogen atoms, or salt thereof.

The number of carbon atoms in the alkyl group which can be adopted as $R^{41}$, $R^{43}$, and $R^{45}$ is preferably 1 to 20, more preferably 1 to 10, still more preferably 1 to 5, and particularly preferably 1 to 3, and among these, a methyl group or an ethyl group is preferable. However, in a case of an alkyl group having a group having a ring structure as a substituent, the number of carbon atoms thereof is preferably 7 to 20, more preferably 7 to 12, and still more preferably 7 to 10. The ring structure of the alkyl group having a ring structure may be an aromatic ring (including an aromatic heterocyclic ring) or an aliphatic ring, and an aromatic hydrocarbon ring, or an aliphatic ring is preferable. Specific examples of the alkyl group having a ring structure include a benzyl group and phenethyl group, and a benzyl group is particularly preferable.

The number of carbon atoms of the cycloalkyl group which can be adopted as $R^{41}$ and $R^{43}$ is preferably 3 to 20, more preferably 3 to 10, still more preferably 4 to 8, and particularly preferably 5 or 6. Specific examples of the cycloalkyl group include cyclopropyl, cyclopentyl, and cyclohexyl, and cyclohexyl is particularly preferable.

The number of carbon atoms of the alkenyl group which can be adopted as $R^{41}$ and $R^{43}$ is preferably 2 to 20, more preferably 2 to 10, and still more preferably 2 to 5. Examples thereof include vinyl and allyl.

The aromatic group which can be adopted as $R^{41}$ and $R^{43}$ may be an aromatic hydrocarbon group or an aromatic heterocyclic ring group, and an aromatic hydrocarbon group is preferable.

The number of carbon atoms of the aromatic hydrocarbon group is preferably 6 to 20, more preferably 6 to 16, and still more preferably 6 to 12. As the aromatic hydrocarbon group, phenyl and naphthyl are preferable and phenyl is more preferable.

As the aromatic heterocyclic ring group, a 5- or 6-membered ring is preferable, and a benzene ring or a hetero ring may be condensed. As the hetero atom configuring a heterocyclic ring of the aromatic heterocyclic ring group, a nitrogen atom, an oxygen atom, and a sulfur atom are preferable, and the number of carbon atoms is preferably 0 to 20, more preferably 1 to 16, and still more preferably 3 to 12. Examples of such a hetero ring include a pyrrole ring, a thiophene ring, a furan ring, a pyrazole ring, an oxazole ring, a thiazole ring, a pyridine ring, and an indole ring.

Examples of the substituent which can be adopted as $R^{45}$ include groups selected from the above substituent group T. The substituent which can be adopted as $R^{45}$ is preferably an alkyl group, a cycloalkyl group, an alkenyl group, an aromatic group, a halogen atom, a formyl group, an acyl group, a cyano group, and a water-soluble group.

In the present specification, the water-soluble group is a group which increases solubility of the compound to water, and an anionic or cationic group or a group which can be decomposed to become an anionic group (for example, pKa is preferably 10 or less). Examples of such a water-soluble group include a sulfo group or a salt thereof, a carboxyl group or a salt thereof, a phosphoric acid group or a salt thereof, a hydroxyl group, a mercapto group, an amino group, an onio group (preferably, an ammonia group), a sulfonamide group, an acyl sulfamoyl group, an alkyl or aryl sulfonylsulfamoyl group, and a group having an active methine or a methylene structure. Among these, a sun group or a salt thereof, a carboxyl group or a salt thereof, a hydroxyl group, or an amino group is more preferable.

A hydroxyl group, a mercapto group, an amino group, a sulfonamide group, an acyl sulfamoyl group, an alkyl or aryl sulfonylsulfamoyl group, and a group having an active methine or methylene structure also include a state of a salt thereof.

In addition to a salt of a sulfo group or a salt of a carboxyl group, a counter ion that forms a salt of a hydroxyl group, a mercapto group, an amino group or a salt thereof, a sulfonamide group, an acyl sulfamoyl group, an alkyl or aryl sulfonylsulfamoyl group, and a group having an active methine or methylene structure may be an inorganic ion or an organic ion.

Preferable examples of the inorganic ion include ammonium ion and alkali metal ion (for example, lithium ion, sodium ion, and potassium ion), and examples of the organic ion include an organic cationic onium ion, an organic ammonium ion (for example, a tetramethylammonium ion or a tetramethylguanidinium ion), a cation of a nitrogen-containing heteroaromatic ring (for example, a pyrrolidinium ion or a pyridinium ion), a phosphonium ion (for example, tetramethylphosphonium ion), and a sulfonium ion (for example, trimethylsulfonium ion). Among these counter ions, an alkali metal ion, that is, an alkali metal salt is preferable.

As a counter ion in a case where the compound represented by General Formula (A) becomes a tautomer so as to form a salt, the same counter ions described above are preferably applied.

Meanwhile, in a case of a salt of an amino group, an acid forming a salt may be an inorganic acid or may be an organic acid.

Examples of a case of the inorganic acid include hydrochloric acid, bromic acid, sulfuric acid, phosphoric acid, or boric acid, and examples of a case of the organic acid include aliphatic or aromatic carboxylic acid or sulfonic acid (for example, formic acid, acetic acid, oxalic acid, benzoic acid, methanesulfonic acid, benzesulfonic acid, nicotinic acid, and the like).

In addition, in a case of the onio group, an inorganic or an organic anion is used, and examples thereof include an anion of the above-described inorganic or organic acid.

$R^{45}$ is preferably a hydrogen atom, an alkyl group, a cycloalkyl group, an alkenyl group, an aromatic group, a halogen atom, a formyl group, an acyl group, a cyano group, or a hydroxyl group.

In a case where $R^{41}$, $R^{43}$, and $R^{45}$ are an alkyl group, a cycloalkyl group, an alkenyl group, or an aromatic group, examples of a substituent which may be a substituent thereof include the groups exemplified in the substituent group T, and among these, an alkyl group, a cycloalkyl group, an alkenyl group, an aromatic group, a heterocyclic ring group, an alkoxy group, an alkylthio group, an alkylsulfonyl group, a halogen atom, a formyl group, an acyl group, a silyl group, or a water-soluble group is preferable, an alkyl group, a cycloalkyl group, an aryl group, a heterocyclic ring group, an alkoxy group, an alkylthio group, an alkylsulfonyl group, a halogen atom, a formyl group, an acyl group, a silyl group, or a water-soluble group is more preferable, and an alkyl group, a cycloalkyl group, an aryl group, a heterocyclic ring group, an alkoxy group, an alkylthio group, an alkylsulfonyl group, a halogen atom, formyl group, acyl group, hydroxyl group, a sulfo group or a salt thereof, a carboxyl group or a salt thereof, a boronic acid group or a salt thereof, a carbamoyl group, a sulfamoyl group, or an onio group (preferably, an ammonio group including a quaternary ammonio group) is still more preferable.

A preferable range of the compound represented by General Formula (A) is widely divided into the following two types, although a use thereof depends on a purpose thereof.

A first preferable aspect is a compound of a combination of the following substituents.

The compound is a compound in which $R^{41}$, $R^{43}$, and $R^{45}$ each independently represent a hydrogen atom, an alkyl group, a cycloalkyl group, an alkenyl group, or an aromatic group, and the alkyl group, the cycloalkyl group, the alkenyl group, and the aromatic group may include a substituent, and as this substituent, a substituent other than the above-described water-soluble group is included among the groups exemplified in the substituent group T.

The substituent which may be included in each group described above is preferably an alkyl group, a cycloalkyl group, an alkenyl group, an aromatic group, a heterocyclic ring group, an alkoxy group, an alkylthio group, an acyl group, a silyl group, or a halogen atom.

Any one of $R^{41}$, $R^{43}$, and $R^{45}$ is preferably a group having a ring structure, and the number of ring structures is preferably 1 to 6, more preferably 2 to 6, still more preferably 2 to 5, and particularly preferably 3 to 5.

As such a ring, an aliphatic hydrocarbon ring or an aromatic hydrocarbon ring is preferable, and a cyclopentane ring, a cyclohexane ring, a benzene ring, or a naphthalene ring is more preferable, and a cyclohexane ring or a benzene ring is still more preferable.

In a case where $R^{41}$, $R^{43}$, and $R^{45}$ are cyclic groups, a cycloalkyl group or an aryl groups is preferable. In a case where $R^{41}$, $R^{43}$, and $R^{45}$ are a group having a ring structure, a group having a cycloalkyl group or an aryl group as exemplified in the substituent group T as a substituent is preferable, a cycloalkyl-substituted alkyl group and an aralkyl group are particularly preferable, and a benzyl group is most preferable.

As the cyclic group or the group having a ring structure, a cycloalkyl group, an aryl group, or an aralkyl group is preferable among the above examples.

The molecular weight of the compound of the first aspect is preferably 250 to 1,200, more preferably 300 to 800, and particularly preferably 350 to 600.

For example, in a case where the polarizing plate protective film is formed with the combination and the molecular weight of the substituent set to be in such preferable ranges, it is possible to obtain a film which is excellent in suppressing volatilization from the polarizing plate protective film of the compound represented by General Formula (A) and which has high transparency.

A second preferable aspect is a compound of a combination of the following substituents.

In contrast to the first aspect, this aspect utilizes a polar effect and also takes diffusibility in the formed film into consideration.

$R^{41}$ and $R^{43}$ each independently represent a hydrogen atom, an alkyl group, a cycloalkyl group, an alkenyl group, or an aromatic group, and $R^{45}$ is a hydrogen atom or a substituent. The compound is 1) compound in which any one of $R^{41}$, $R^{43}$, and $R^{45}$ is a water-soluble group or a group including a water-soluble group, 2) compound in which the molecular weight thereof is 128 or more and less than 250, and/or 3) compound in which any one or two of $R^{41}$, $R^{43}$, and $R^{45}$ are hydrogen atoms.

The molecular weight of the compound of the second aspect is preferably 128 to 1,200 and more preferably 150 to 800.

Hereinafter, specific examples of the compound represented by General Formula (A) are shown, but the present invention is not limited thereto.

A-1

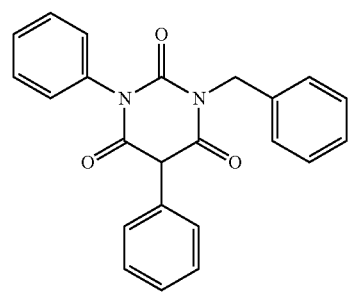

A-2

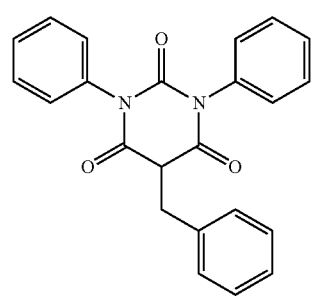

A-3

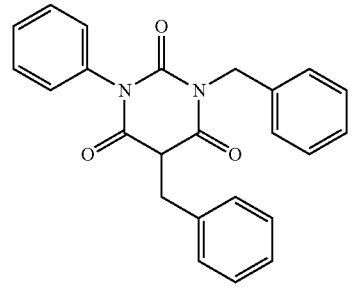

A-4

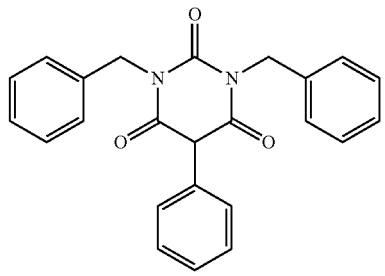

A-5

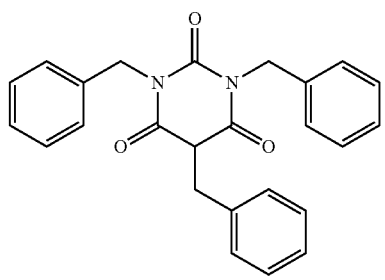

A-6

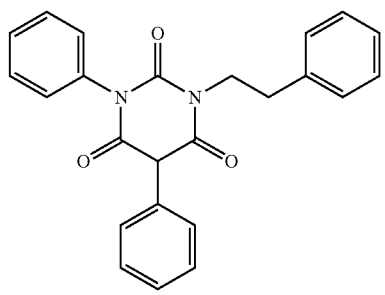

A-7

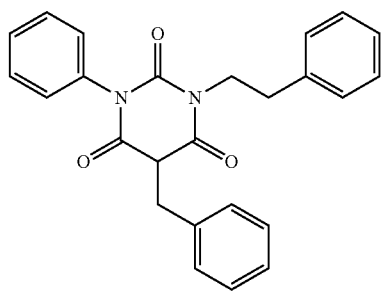

A-8

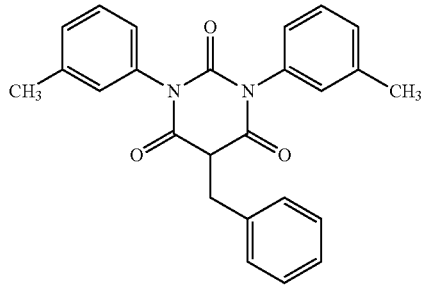

A-9
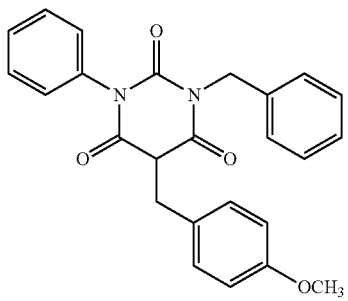
A-10
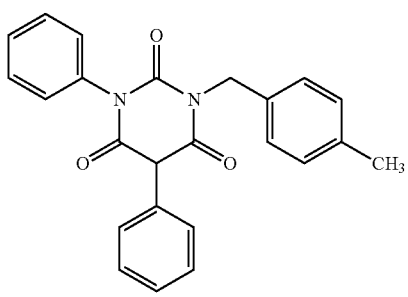
A-11
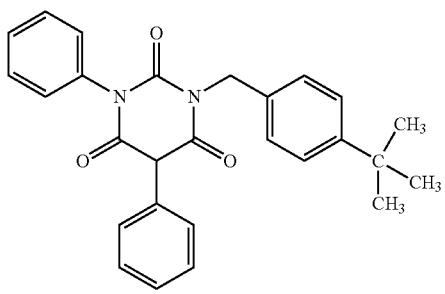
A-12
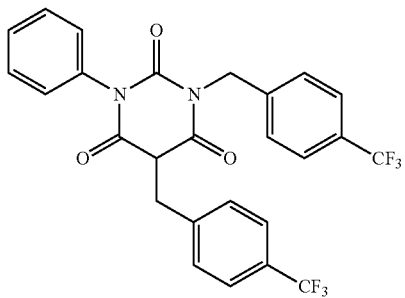
A-13
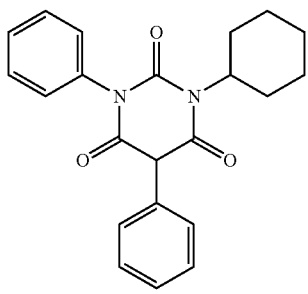
A-14
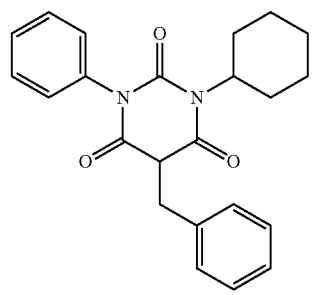
A-15
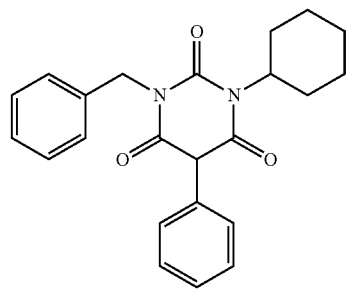
A-16
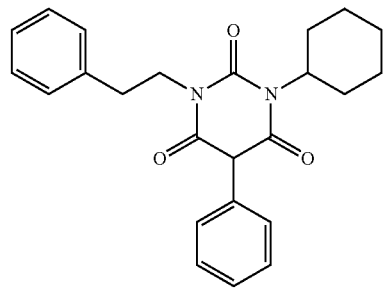
A-17
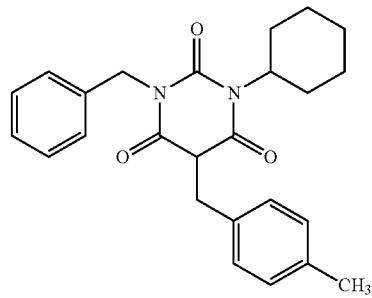
A-18
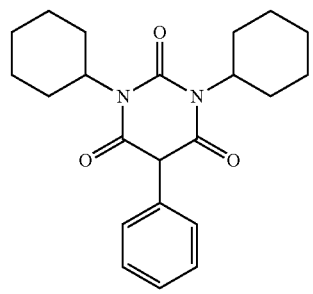

-continued
A-19 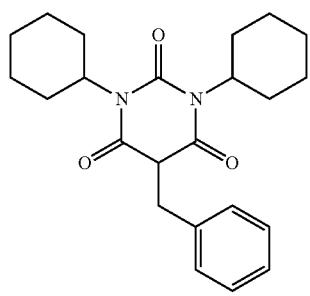
A-20 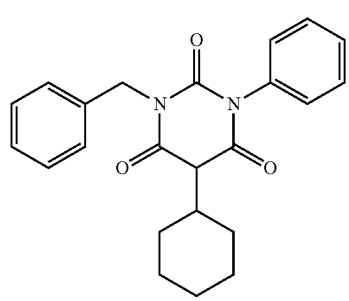
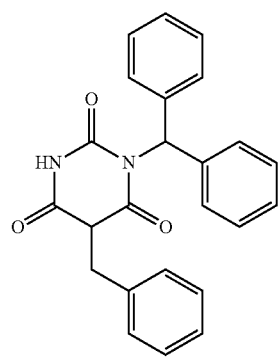
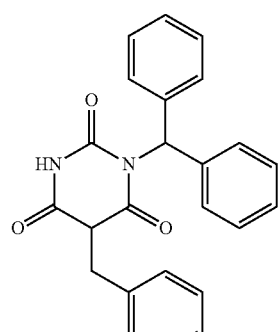
A-23 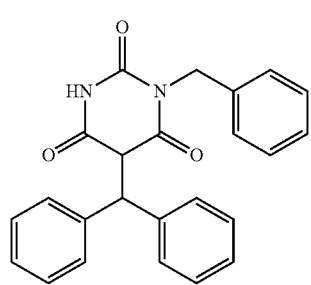
-continued
A-24 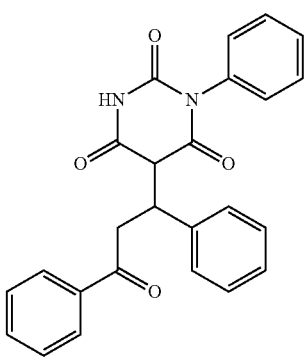
A-25 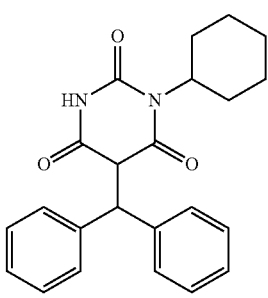
A-26 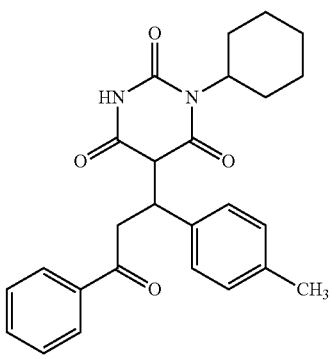
A-27 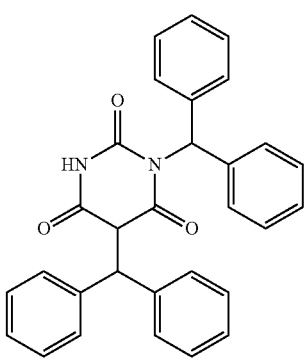

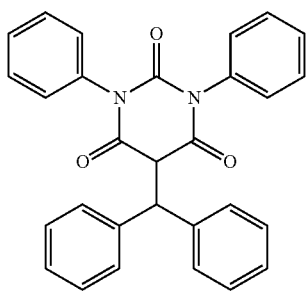
A-28
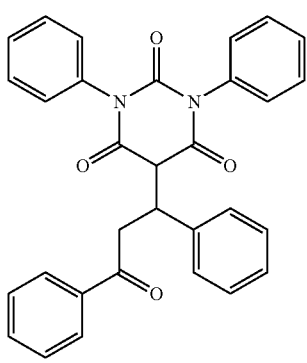
A-29
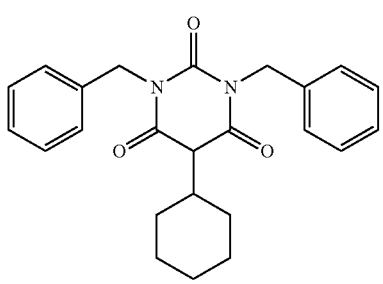
A-30
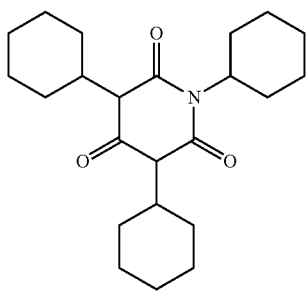
A-31
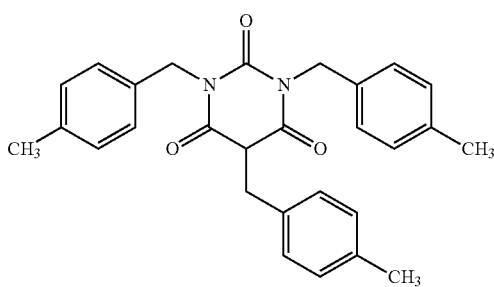
A-32
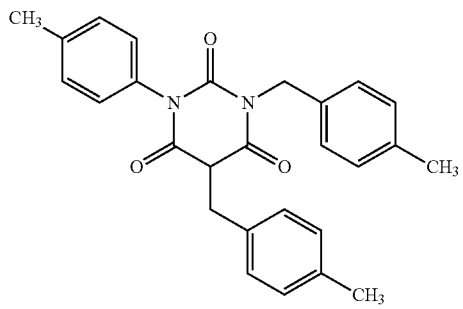
A-33
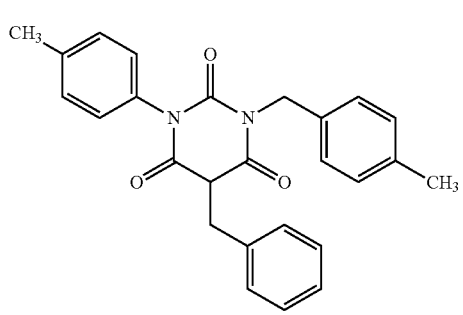
A-34
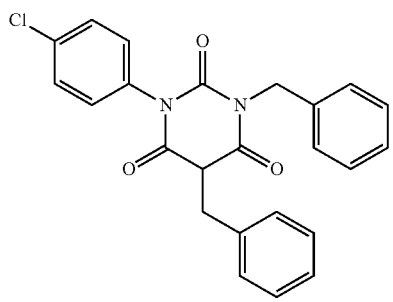
A-35
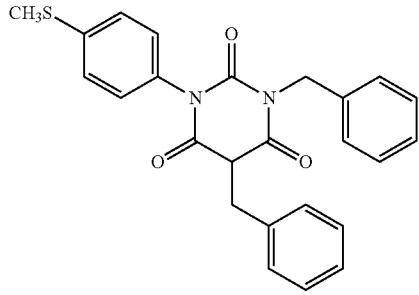
A-36
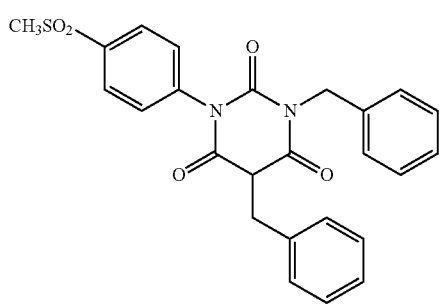
A-37

A-38
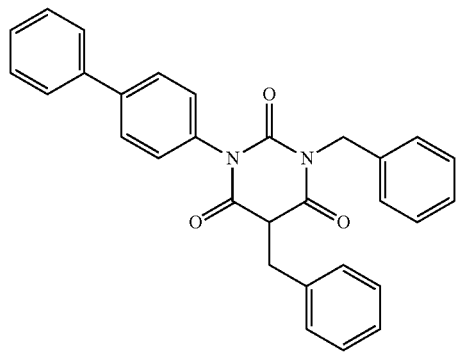
A-39
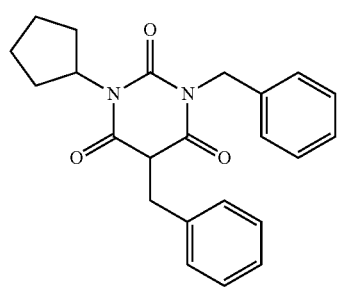
A-40
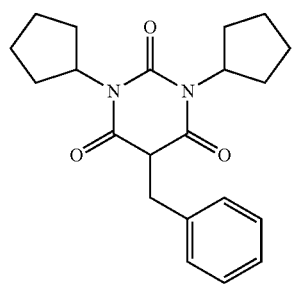
A-41
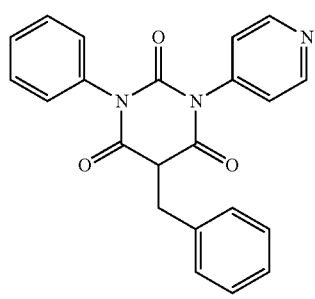
A-42
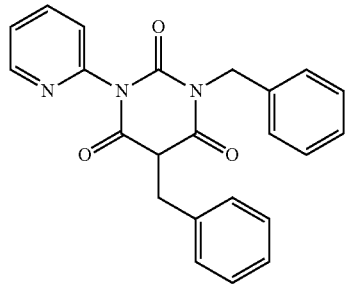
A-43
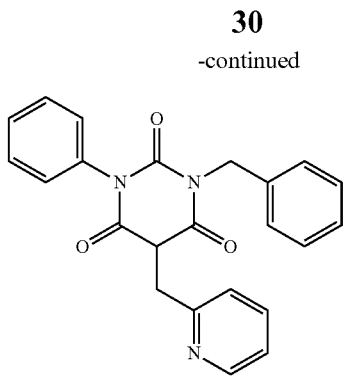
A-44
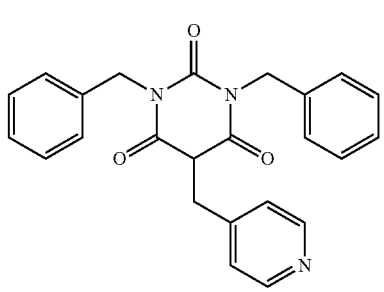
A-45
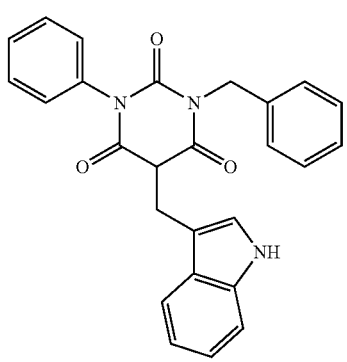
A-46
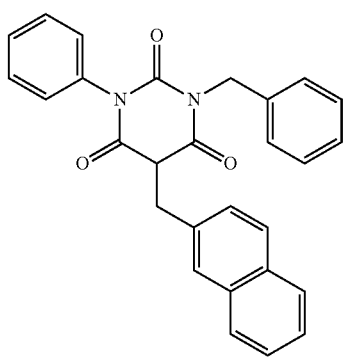
A-47
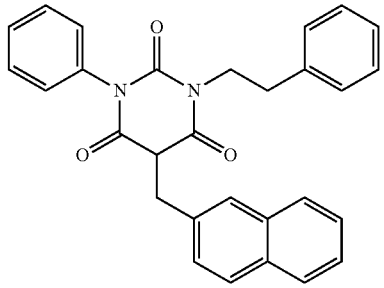

A-48 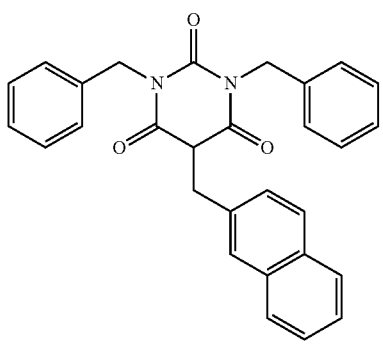
A-49 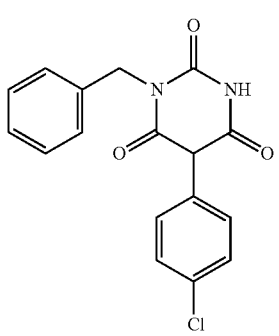
A-50 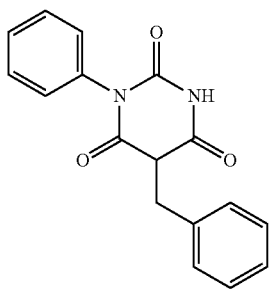
A-51 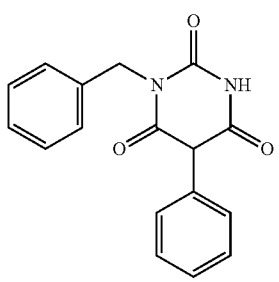
A-52 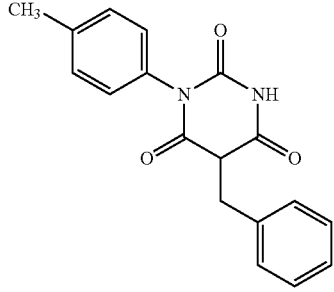
A-53 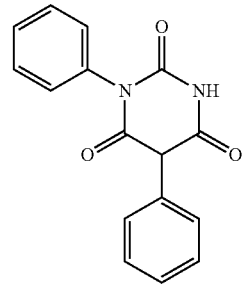
A-54 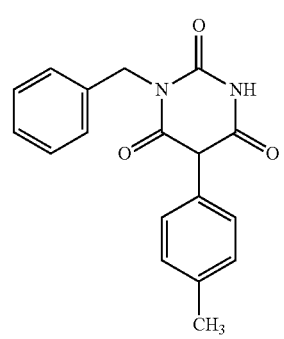
A-55 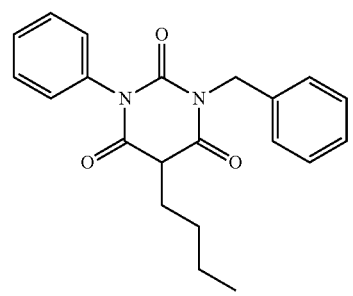
A-56 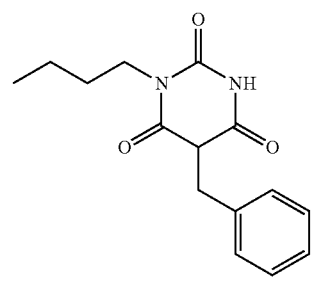
A-57 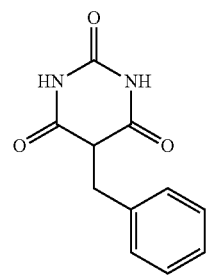

A-58 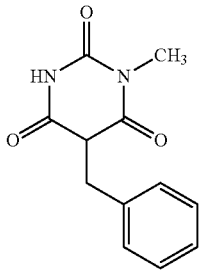

A-59 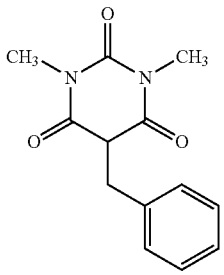

A-60 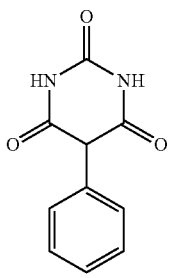

A-61 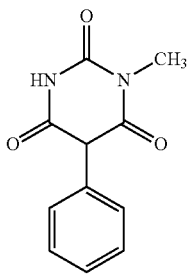

A-62 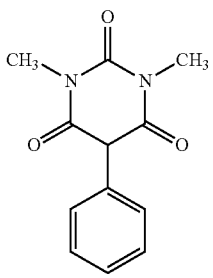

A-63 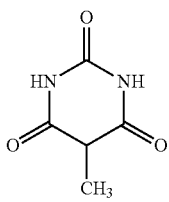

A-64 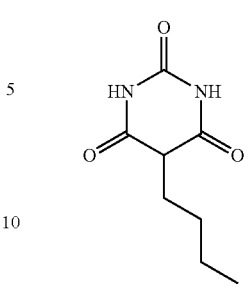

It is known that the compound represented by General Formula (A) can be synthesized by using a synthesis method of barbituric acid which causes condensation between a urea derivative and a malonic acid derivative. Barbituric acid including two substituents on a nitrogen atom is obtained by heating N,N'-disubstituted urea and malonyl chloride or heating a combination of malonic acid and an activated agent such as acetic anhydride, and for example, methods disclosed in Journal of the American Chemical Society, Vol. 61, pp. 1015 (1939), Journal of Medicinal Chemistry, Vol. 54, pp. 2409 (2011), Tetrahedron Letters, Vol. 40, pp. 8029 (1999), and WO2007/150011A can be preferably used.

In addition, malonic acid used in condensation may be an unsubstituted or a substituted malonic acid, and in a case where malonic acid including a substituent corresponding to $R^{45}$ is used, it is possible to synthesize the compound represented by General Formula (A) by constructing barbituric acid. In addition, a barbituric acid in which a fifth position is unsubstituted is obtained by condensation of an unsubstituted malonic acid and a urea derivative, and by modification thereof, the compound represented by General Formula (A) may be synthesized.

As a method of modifying the fifth position, a nucleophilic substitution reaction with alkyl halide or the like or an addition reaction such as Michael addition reaction can be used. In addition, a method of performing dehydration condensation with aldehyde or ketone to generate an alkylidene or an arylidene compound and then reducing a double bond can also be preferably used. For example, a reducing method by zinc is disclosed in Tetrahedron Letters, Vol. 44, pp. 2203 (2003), a reducing method by catalytic reduction is disclosed in Tetrahedron Letters, Vol. 42, pp. 4103 (2001) and Journal of the American Chemical Society, Vol 119, pp. 12849 (1997), and a reducing method by NaBH$_4$ is disclosed in Tetrahedron Letters, Vol. 28, pp. 4173 (1987). All of these are synthesis methods which can be preferably used in a case where an aralkyl group is included at the fifth position and in a case where a cycloalkyl group is included at the fifth position.

The synthesis method of the compound represented by General Formula (A) is not particularly limited thereto.

The content of the compound represented by General Formula (A) in the polarizing plate protective film (the total content in a case where two or more kinds thereof are contained) is not particularly limited, but is preferably 0.1 to 30 parts by mass, more preferably 0.2 to 15 parts by mass, still more preferably 0.3 to 12 parts by mass, still more preferably 0.5 to 12 parts by mass, still more preferably 1 to 12 parts by mass, still more preferably 2 to 12 parts by mass, and still more preferably 3 to 10 parts by mass, with respect to the content of the cellulose acylate of 100 parts by mass.

With an addition amount of the compound represented by General Formula (A) being set to be within the preferable range described above, it is possible to effectively decrease water vapor permeability and to further prevent occurrence of haze from occurring.

Acetal Compound

It is also preferable to contain at least one compound represented by General Formula (I) or General Formula (II) (hereinafter will be collectively referred to as "acetal compounds"). In a case where the polarizing plate protective film of the present invention contains the compounds represented by General Formula (I) or (II), emission of a dichroic coloring agent such as iodine from a polarizer can be further suppressed, and a deterioration of the polarizer due to heat or moist heat can be suppressed more effectively.

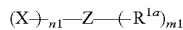
General Formula (I)

In General Formula (I), Z represents a benzene ring or a cyclohexane ring.

In a case where Z is a benzene ring, General Formula (I) is represented by General Formula (I-1). In addition, in a case where Z is a cyclohexane ring, General Formula (I) is represented by General Formula (I-2). In General Formulas (I-1) and (I-2), X, n1, $R^{1a}$ and m1 have the same meanings as X, n1, $R^{1a}$, and m1 in General Formula (I), respectively, and preferable aspects thereof are also the same.

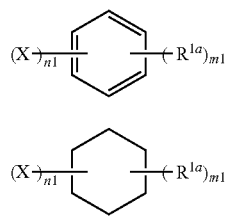

The substituents in General Formulas (I), (I-1), and (I-2) will be described.

In General Formula (I), X represents a group represented by General Formula (I-A-3).

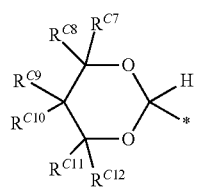
General Formula (I-A-3)

In General Formula (I-A-3), $R^{C7}$ to $R^{C12}$ represent a hydrogen atom, an alkyl group, a cycloalkyl group, an aryl group, an acyl group, an aryl carbonyl group, an alkoxy group, or an alkoxycarbonyl group, in which at least two of $R^{C7}$, $R^{C8}$, $R^{C9}$, $R^{C10}$, $R^{C11}$, or $R^{C12}$ may be bonded to each other to form a ring. * represents a bond.

The alkyl group which can be adopted as $R^{C7}$ to $R^{C12}$ may be linear or branched. The number of carbon atoms of the alkyl group preferably is 1 to 12, more preferably 1 to 8, and still more preferably 1 to 6. Specific examples of the alkyl group include methyl, ethyl, n-propyl, isopropyl, n-butyl, isobutyl, s-butyl, n-hexyl, n-octyl, 2-ethylhexyl, n-decyl, n-dodecyl, benzyl, phenoxyethyl, and methoxyethyl.

The number of carbon atoms in the cycloalkyl group which can be adopted as $R^{C7}$ to $R^{C12}$ is preferably 3 to 12, more preferably 5 to 12, and still more preferably 5 to 8. Specific examples of the cycloalkyl group include cyclopropyl, cyclopentyl, and cyclohexyl, and cyclopentyl and cyclohexyl are preferable.

The number of carbon atoms in the aryl group which can be adopted as $R^{C7}$ to $R^{C12}$ is preferably 6 to 20, more preferably 6 to 16, and still more preferably 6 to 12. Specific examples of the aryl group include a phenyl group and a naphthyl group, and a phenyl group is preferable.

The number of carbon atoms in the acyl group which can be adopted as $R^{C7}$ to $R^{C12}$ is preferably 2 to 20. The acyl group may be any one of an alkylcarbonyl group, an alkenylcarbonyl group, a cycloalkycarbonyl group, a cycloalkenylcarbonyl group, an arylcarbonyl group, and a heterocyclic carbonyl group. Examples thereof include acetyl, propionyl, butyryl, isobutyryl, valeryl, isovaleryl, pivaloyl, benzoyl, naphthoyl, acryloyl, nicotinoyl, cyclopropylcarbonyl, cyclohexylcarbonyl, and the like.

Among the acyl groups, an alkylcarbonyl group and an arylcarbonyl group are preferable.

The number of carbon atoms in the arylcarbonyl group which can be adopted as $R^{C7}$ to $R^{C12}$ is preferably 7 to 20. Preferable specific examples of the arylcarbonyl include benzoyl and naphthoyl.

The number of carbon atoms of the alkoxy group of $R^{C7}$ and $R^{C12}$ is preferably 1 to 20 and more preferably 2 to 16. Specific examples of the alkoxy group include methoxy, ethoxy, isopropoxy, hexyl, and 2-ethylhexyloxy.

The number of carbon atoms of the alkoxycarbonyl group of $R^{C7}$ and $R^{C12}$ is preferably 2 to 12, more preferably 2 to 8, and still more preferably 2 to 6. Specific examples of the alkoxycarbonyl group include methoxycarbonyl, ethoxycarbonyl, isopropoxycarbonyl, n-butoxycarbonyl, t-butoxycarbonyl, 2-ethylhexyloxycarbonyl, and benzyloxycarbonyl.

The ring which can be formed by bonding at least two of $R^{C7}$, $R^{C8}$, $R^{C9}$, $R^{C10}$, $R^{C11}$, or $R^{C12}$ with each other is preferably a 5- or 6-membered ring.

The formed ring may include a substituent, and examples of such a substituent include a group selected from the substituent group T described above.

$R^{C7}$ to $R^{C12}$ is preferably a hydrogen atom or an alkyl group.

In General Formula (I), n1 representing the number of X is an integer of 2 to 6, preferably an integer of 2 to 4, and more preferably 2.

In General Formula (I), $R^{1a}$ represents a substituent. Examples of the substituent include a group selected from the substituent group T described above. Among the groups, a group selected from a hydrogen atom, a cyano group, and a methoxycarbonyl group is preferable.

In General Formula (I), m1 representing the number of $R^{1a}$ is an integer of 0 to 4, preferably an integer of 0 to 2, more preferably 0 or 1, and still more preferably 0.

In a case where m1 is an integer of 2 or more, a plurality of $R^{1a}$'s may be bonded to each other to form a ring.

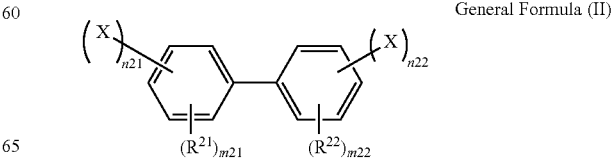
General Formula (II)

In General Formula (II), X has the same meaning as X in General Formula (I), and the preferable aspect thereof is also the same.

n21 and n22 which represent the number of X are an integer of 1 to 5, preferably 1 or 2, and more preferably 1.

In General Formula (II), $R^{21}$ and $R^{22}$ each represent a substituent. Examples of the substituent include a group selected from the substituent group T described above. Among the groups, a group selected from a hydrogen atom, a cyano group, and a methoxycarbonyl group is preferable.

m21 and m22 which represent the number of $R^{21}$ and $R^{22}$ are integers of 0 to 4.

In a case where m21 is an integer of 2 or more, a plurality of $R^{21}$'s may be bonded to each other to form a ring. In addition, in a case where m22 is an integer of 2 or more, a plurality of $R^{22}$'s may be bonded to each other to form a ring.

The total number of carbon atoms in the constituent moieties other than X in General Formula (I) or (II) is preferably 40 or less, more preferably 6 to 40, and still more preferably 12 to 24 for the reason of more excellent durability.

The polarizing plate protective film of the present invention preferably contains the compound represented by General Formula (I-1) or General Formula (II).

In regard to the acetal compound that can be used in the present invention, preferable basic skeletons (B1 to B7) and structures (A-401 to A-409) of acetal moieties that can be adopted as $X^1$ to $X^3$ in this basic skeleton are shown below. In the structures of the following acetal moieties, * represents a linking site. B1 to B7 represent basic skeletons, and B1 and B6 may have the above substituents $R^{21}$ and $R^{22}$ as specific structures thereof. Similarly, B2 to B5 and B7 may have a form in which the specific structures thereof have the above substituent $R^{1a}$.

An acetal compound having a form of adopting any combination of each basic skeleton shown below and the structures of each of the acetal moieties shown below can be suitably used in the present invention.

Basic Skeleton

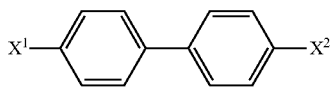
B1

B2

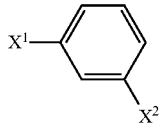
B3

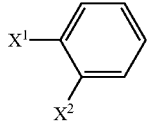
B4

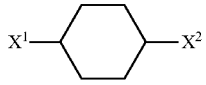
B5

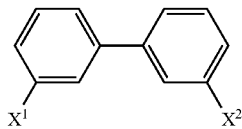
B6

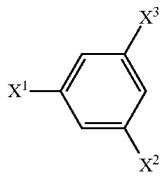
B7

Acetal moiety ($X^1$ to $X^3$ in the above basic skeleton)

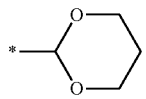
A-401

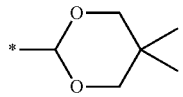
A-402

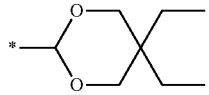
A-403

A-404

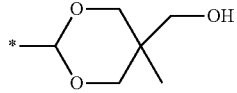
A-405

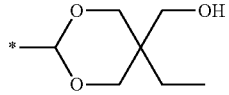
A-406

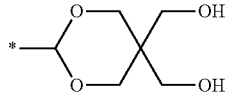
A-407

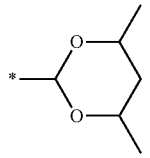
A-408

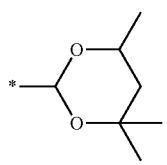
A-409

Specific examples of the acetal compound that can be used in the present invention are shown in Table 1 with reference to the above structures, but the present invention is not limited thereto.

TABLE 1

| Acetal compound | Basic skeleton | X$^1$ | X$^2$ | X$^3$ |
|---|---|---|---|---|
| D-1 | B1 | A-402 | A-402 | |
| D-2 | B2 | A-402 | A-402 | |
| D-3 | B3 | A-402 | A-402 | |
| D-4 | B4 | A-402 | A-402 | |
| D-5 | B5 | A-402 | A-402 | |
| D-6 | B6 | A-402 | A-402 | |
| D-7 | B7 | A-401 | A-401 | A-401 |
| D-8 | B1 | A-401 | A-401 | |
| D-9 | B1 | A-403 | A-403 | |
| D-10 | B1 | A-404 | A-404 | |
| D-11 | B1 | A-405 | A-405 | |
| D-12 | B1 | A-406 | A-406 | |
| D-13 | B1 | A-407 | A-407 | |
| D-14 | B1 | A-408 | A-408 | |
| D-15 | B1 | A-409 | A-409 | |
| D-16 | B2 | A-401 | A-401 | |
| D-17 | B2 | A-403 | A-403 | |
| D-18 | B2 | A-404 | A-404 | |
| D-19 | B2 | A-405 | A-405 | |
| D-20 | B2 | A-406 | A-406 | |
| D-21 | B2 | A-407 | A-407 | |
| D-22 | B2 | A-408 | A-408 | |
| D-23 | B2 | A-409 | A-409 | |

As the above-described acetal compound, commercially available products may be obtained so as to be used or the compound may be synthesized by known methods. For example, the compound can be synthesized by acetalizing a compound having a formyl group according to the methods of the related art. By carrying out a general synthesis reaction such as esterification, amidation, or alkylation using a formyl compound including a substituent as a raw material, it is possible to obtain formyl compounds of various skeletons and then perform synthesis by acetalization thereof. In addition, the formyl compound as a raw material can be synthesized by oxidizing corresponding alcohol by using a general oxidant such as manganese dioxide.

The content of the acetal compound in the polarizing plate protective film is not particularly limited, but is preferably 1.0 to 100.0 mmol, and more preferably 3.0 mmol or more per 1 m$^2$ of the polarizing plate protective film. An upper limit thereof is not particularly limited but is preferably 30.0 mmol or less.

The content of the acetal compound in the polarizing plate protective film is preferably formulated within a range of 0.1 to 50 parts by mass, is more preferably formulated within a range of 1 to 30 parts by mass, and is still more preferably formulated within a range of 4 to 20 parts by mass, with respect to 100 parts by mass of the cellulose acylate constituting the polarizing plate protective film.

Manufacturing of Polarizing Plate Protective Film

Subsequently, manufacture of the polarizing plate protective film of the present invention will be explained.

The manufacture of the polarizing plate protective film of the present invention is not particularly limited, and for example, it is preferable to manufacture the film by a melt film forming method or a solution casting film-forming method (solvent casting method), and is more preferable to manufacture the film by a solution casting film-forming method (solvent casting method) in consideration of volatilization and decomposition of an additive. As examples of the manufacture of a polymer film using the solvent casting method, specifications of each of U.S. Pat. Nos. 2,336,310A, 2,367,603A, 2,492,078A, 2,492,977A, 2,492,978A, 2,607,704A, 2,739,069A, and 2,739,070A, specifications of each of GB640731B and GB736892B, and JP1970-4554B (JP-S45-4554B), JP1974-5614B (JP-S49-5614B), JP1985-176834A (JP-S60-176834A), JP1985-203430A (JP-S60-203430A), and JP1987-115035A (JP-S62-115035A) can be referred to. In addition, the polarizing plate protective film of the present invention may be subjected to a stretching treatment. In regard to methods and conditions of the stretching treatment, for example, JP1987-115035A (JP-S62-115035A), JP1992-152125A (JP-H04-152125A), JP1992-284211A (JP-H04-284211A), JP1992-298310A (JP-H04-298310A), and JP1999-48271A (JP-H11-48271A) can be referred to.

Casting

Examples of the solution casting method include a method of uniformly extruding a prepared dope (a solution obtained by dissolving cellulose acylate in a solvent) from a pressure die onto a metal support, a method using a doctor blade, in which a film thickness is adjusted using a blade for a dope once cast on a support of a metal or the like, and a method using a reverse roll coater that adjusts with a reverse rotating roll, and the like, and the method by pressure die is preferable. The pressure die includes a coat hanger type and a T-die type, all of which can be preferably used. In addition to the methods exemplified above, a known method in which a cellulose acylate solution is cast so as to form a film can be adopted. Conditions of each of the above-described casting methods can be appropriately set in consideration of differences in boiling point and the like of a solvent to be used.

The polarizing plate protective film of the present invention may have a single layer or multilayers. In the case of having multilayers, it is preferable to use a lamination casting method such as a co-casting method, a sequential casting method, a coating method, and the like, and it is particularly preferable to use a simultaneous co-casting (also referred to as simultaneous multilayer co-casting) method from the viewpoint of stable manufacture and reduction of a production cost.

In a case of manufacturing the polarizing plate protective film by the co-casting method and a sequential casting method, first, a dope for each layer is prepared, and this solution is cast on a support.

In the co-casting method (simultaneous multilayer casting), first, a dope is extruded on a casting support (band or drum) using a casting Gieser capable of simultaneously extruding each of casting dopes of respective layers (three layers or more layers may be used) from separated slits and the like, and then the respective layers are simultaneously cast. After casting, a film can be formed by peeling off from the support after an appropriate time and drying. By using a co-casting Gieser, for example, a total of three layers, which are, two skin layers formed of a skin layer dope on a casting support and a core layer formed of a core layer dope sandwiched between these skin layers can be simultaneously extruded on the support so as to be cast.

In the sequential casting, a casting dope for a first layer is first extruded from the casting Gieser onto a casting support so as to be cast and dried or not dried, and a second layer casting dope is extruded from the from the casting Gieser so as to be cast, and if necessary, the dope is sequentially cast and laminated up to a third layer or more, and then a multilayer film is formed by peeling off from the support after an appropriate time and drying.

In addition, in the coating method, generally, a core layer is formed into a film shape by a solution casting film-forming method, a coating solution which is a target cellulose silicate solution is applied to a surface layer thereof and dried, and therefore a laminated structure is formed.

Stretching

It is also preferable that the polarizing plate protective film of the present invention is subjected to a stretching treatment after casting and drying. A stretching direction of a cellulose ester resin layer may be either a film handling direction (machine direction (MD)) or a direction perpendicular to the conveying direction (transverse direction (TD)). In consideration of the subsequent manufacturing process of the polarizing plate, the TD direction is preferable. The stretching treatment may be carried out a plurality of times in two or more stages.

A method of performing the stretching in the TD direction is, for example, disclosed in JP1987-115035A (JP-S62-115035A), JP1992-152125A (JP-H04-152125A), JP1992-284211A (JP-H04-284211A), JP1992-298310A (JP-H04-298310A), and JP1999-48271A (JP-$H_{11}$-48271A). In a case of stretching in the TD direction, the stretching can be performed by handling a film while holding a width of the film by a tenter and slowly widening the width of the tenter. Alternatively, after drying, a polymer film, the film can also be stretched by using a stretching machine (preferably monoaxial stretching using a long stretching machine).

In a case of stretching in the MD direction, stretching can be performed by, for example, adjusting a speed of a handling roller of the film, and setting a winding-up speed to be faster than a stripping speed of the film.

In the polarizing plate protective film of the present invention, in order to suppress light leakage in a case where the polarizing plate is viewed obliquely, an aspect in which a transmission axis of the polarizer and an in-plane slow axis of the polarizing plate protective film are arranged in parallel, is preferable. The transmission axis of a continuously-manufactured roll film-shaped polarizer is generally parallel to a width direction of the roll film, and therefore, in order that the roll film-shaped polarizer continuously adheres to the roll film-shaped polarizing plate protective film, it is required that an in-plane slow axis of the roll film-shaped polarizing plate protective film is parallel to a width direction of the polarizing plate protective film. Therefore, it is preferable that stretching is performed more in the TD direction. Furthermore, the stretching treatment may be performed during a film forming step, or the original film wound by film formation may be subjected to the stretching treatment.

The stretching in the TD direction is preferably 5% to 100%, more preferably 5% to 80%, and particularly preferably 5% to 40%. In a case of unstretching, the stretching becomes 0%. The stretching treatment may be performed during the film forming step, or the original film wound by film formation may be subjected to the stretching treatment. In the former case, the stretching may be carried out in a state including an amount of residual solvent, and it is preferable that the stretching is performed in a state where an amount of residual solvent=(residual volatile content mass/film mass after heat treatment)×100% is 0.05% to 50%. It is more preferable that 5% to 80% stretching is performed in a state where an amount of residual solvent is 0.05% to 5%.

Additive

The above polarizing plate protective film contains at least one of the compounds represented by any one of General Formulas (1) to (3). That is, in the manufacture of the polarizing plate protective film, the compounds represented by any one of General Formulas (1) to (3) is contained (dissolved) in a dope. In the dope, the content of the compounds represented by any one of General Formulas (1) to (3) is preferably 0.1 to 50 parts by mass, more preferably 0.1 to 20 parts by mass, and still more preferably 0.1 to 10 parts by mass in total with respect to 100 parts by mass of the content of the cellulose acylate in the dope.

The polarizing plate protective film of the present invention may contain additives other than those described above within a range not impairing the effect of the present invention. Examples of such additives include known plasticizers, organic acids, coloring agents, polymers, retardation adjusters, ultraviolet absorbents, antioxidants, matting agents, and the like. In regard to the above description, the description of paragraphs 0062 to 0097 of JP2012-155287A can be referred to, and the contents of which are incorporated into the specification of the present application. In addition, examples of the additives include peel accelerators, organic acids, and a polyvalent carboxylic acid derivative. In regard to the above description, the description of paragraphs 0212 to 0219 of WO2015/005398A can be referred to, and the contents of which are incorporated into the specification of the present application.

In the above dope, the total content of the additives including the compounds represented by General Formulas (1) to (3) and the compound represented by General Formula (A) is preferably 50 parts by mass or less, more preferably 30 parts by mass or less, and still more preferably 5 to 20 parts by mass, with respect to 100 parts by mass of the content of the cellulose acylate.

Saponification Treatment

The polarizing plate protective film of the present invention can be improved in adhesiveness to a polarizer material such as polyvinyl alcohol through an alkali saponification treatment.

As a method of saponification, a method disclosed in paragraphs 0211 and 0212 of JP2007-86748A can be used.

For example, it is preferable that the alkali saponification treatment with respect to the polarizing plate protective film is performed with a cycle of immersing the film surface in an alkali solution, performing neutralizing with an acid solution, and washing the film surface with water and drying the film surface. Examples of the alkali solution include a potassium hydroxide solution, and a sodium hydroxide solution. The concentration of hydroxide ions is preferably in a range of 0.1 to 5.0 mol/L and more preferably in a range of 0.5 to 4.0 mol/L. The temperature of the alkali solution is preferably in a range of room temperature to 90° C. and more preferably in a range of 40° C. to 70° C.

Instead of the alkali saponification treatment, a simple adhesion process disclosed in JP1994-94915A (JP-H06-94915A) and JP1994-118232A (JP-H06-118232A) may be performed.

The film thickness of the polarizing plate protective film of the present invention is preferably 1 to 80 μm, more preferably 1 to 60 μm, and still more preferably 3 to 60 μm.

Functional Layer

In the polarizing plate protective film of the present invention, a functional layer suitable for the purpose can be provided on the polarizing plate protective film, if necessary.

Examples of the functional layer include a hard coat layer, an antireflection layer, a light scattering layer, an antifouling layer, an antistatic layer, an adhesive layer, a dye layer, an antihalation layer, an antiglare layer, a gas barrier layer, a sliding layer, an ultraviolet absorbing layer, a polarizing layer, and the like, and these may be provided as one layer having a plurality of functions.

As an example, the hard coat layer is a layer for imparting hardness or scratch resistance to the polarizing plate protective film.

For example, by coating of a coating composition on the polarizing plate protective film and hardening, it is possible to form a hard coat layer having a high degree of adhesiveness to the polarizing plate protective film. By adding a filler and/or an additive to the hard coat layer, it is also possible to impart physical ability such as mechanical, electrical, or optical ability and/or chemical ability such as water repellency or oil repellency to the hard coat layer. The thickness of the hard coat layer is preferably 0.1 to 6 μm and more preferably 3 to 6 μm. With the hard coat layer having a small thickness in such a range, a polarizing plate protective film including a hard coat layer in which brittleness is improved, physical properties such as curl prevention are improved, the weight is decreased, and the manufacturing cost is reduced, can be obtained.

The hard coat layer is preferably formed by hardening a curable composition. The curable composition is preferably prepared as a liquid coating composition. As an example of the coating composition, a monomer or an oligomer for matrix formation binder, polymers, and organic solvents are included. It is possible to form the hard coat layer by coating and then hardening the coating composition. In the hardening, a crosslinking reaction or a polymerization reaction can be used.

Properties of Polarizing Plate Protective Film

It is necessary that the polarizing plate protective film has low water vapor permeability, high hardness such as Knoop hardness and pencil hardness, and low ultraviolet ray transmittance and haze. In addition, it is preferable that decrease in molecular weight and yellowing do not occur after a lapse of time under moist heat.

Water Vapor Permeability

Water vapor permeability of the polarizing plate protective film of the present invention under conditions of 40° C. and relative humidity of 90% for 24 hours is preferably 1,050 g/m² or less and more preferably 990 g/m² or less. In a case where the water vapor permeability is within the above range, degradation of the polarizer can be effectively suppressed even under high-temperature high-humidity environments.

The value of the above water vapor permeability is a value obtained by measuring mass (g) of water vapor passing through a sample for 24 hours in an atmosphere of the temperature of 40° C. and relative humidity of 90% and converting the mass into a value per a sample area 1 m², based on water vapor permeability test (cup method) of JIS Z0208.

Knoop Hardness

In the polarizing plate protective film of the present invention, surface hardness measured with an indentation load of 50 mN by using a Knoop indenter is preferably 185 N/mm² or more. More preferably, a minimum value of Knoop hardness measured by rotating a Knoop indenter in the same indentation position with an indentation load of 50 mN based on the method of JIS Z2251 is 210 N/mm² or more. The surface hardness (Knoop hardness) is measured by a nanoindentation method. JIS Z2251 is the Japanese Industrial Standards which was regulated based on ISO4545. For example, the minimum value of Knoop hardness of the total 18 orientations measured by rotating the Knoop indenter by 10° C. at the same indentation position is 210 N/mm² or more. The surface hardness of the polarizing plate protective film is preferably 220 N/mm² or more and more preferably 230 N/mm² or more.

The surface hardness of the polarizing plate protective film can be adjusted by types and added amounts of the additives, a degree of polymerization of the resin, a dope solvent composition, a stretching treatment of the film, and the like.

Pencil Hardness

The polarizing plate protective film of the present invention preferably has high pencil hardness.

The pencil hardness is based on evaluation of pencil hardness of JIS K 5400. Specifically, the humidity of the polarizing plate protective film is controlled at a temperature of 25° C. and relative humidity of 60% for 2 hours, and then evaluation with a load of 500 g is repeated 20 times by using a 3H test pencil regulated based on JIS S 6006, and the evaluation thereof is performed.

Practically, a result of 3H or higher is necessary.

Ultraviolet Ray Transmittance

It is preferable that the polarizing plate protective film of the present invention has high ability of shielding ultraviolet rays in order to prevent a deterioration of the polarizer and/or driving liquid crystals in the liquid crystal cells due to ultraviolet rays. For example, the ultraviolet ray transmittance in a wavelength range of 290 to 300 nm is preferably 10% or less and more preferably 5% or less. With the ultraviolet ray transmittance in a wavelength range of 290 to 300 nm being 10% or less, light excitation such as $I_3^-$ having absorption maximum in the vicinity of the wavelength range of 290 to 300 nm can be prevented, and as a result, it is possible to effectively prevent a deterioration of polarization performance due to light.

Haze

The haze of the polarizing plate protective film of the present invention is preferably 0.01% to 1.00%. The haze thereof is more preferably 0.05% to 0.80%. It is preferable that the haze is 1.00% or less, because the contrast of a liquid crystal display device is increased.

The haze can be measured according to JIS K-7136 by using a haze meter, for example, a haze meter (HGM-2DP, manufactured by Suga Test Instruments Co., Ltd.). In this case, the size of the polarizing plate protective film or the laminate thereof to be measured is set as 40 mm×80 mm, and the measurement is performed under the conditions of the temperature of 25° C. and relative humidity of 60%.

Molecular Weight

In the polarizing plate protective film of the present invention, it is preferable that the molecular weight of the cellulose acylate does not decrease greatly even after a lapse of time under moist heat. A weight-average molecular weight of the cellulose acylate can be measured under the following conditions using high performance liquid chromatography.

Measurement Conditions

Solvent: NMP: Wako Pure Chemical Industries, Ltd. 135-12103 (LiBr 10 mM; manufactured by Kojundo Chemical Laboratory Co., Ltd.)
Column: three TSKgel Super AWM-H (manufactured by TOSOH CORPORATION)
Sample Concentration: 0.1% by mass
Detector: RI MODEL 504 (manufactured by GL Sciences Inc.)
Flow Rate: 10 mL/min
Calibration Curve: STK standard polystyrene (Mw=500 to 1,000,000, manufactured by TOSOH CORPORATION)
Column Temperature: 40° C.

b* Measurement

The polarizing plate protective film of the present invention preferably has a low b*, and it is more preferable that b* is suppressed even after a lapse of time under moist heat.
The measurement of b* was calculated from the transmittance of the film with respect to visible light (380 to 780 nm) using a spectrophotometer UV-3150 (manufactured by Shimadzu Corporation) according to JIS Z 8781.

Polarizing Plate

The polarizing plate of the present invention eludes a polarizer, and at least one polarizing plate protective film of the present invention described above.
In general, the polarizing plate of the present invention has an optical film (polarizing plate protective film) for protecting a polarizer on both sides of a polarizer, and as at least one optical film thereof, the polarizing plate protective film of the present invention is used. In a case where one of the two polarizing plate protective films provided on the both sides of the polarizer is the polarizing plate protective film of the present invention, the other polarizing plate protective film is not particularly limited, and a known polarizing plate protective film can be widely used.

Polarizer

The polarizer used for the polarizing plate of the present invention is formed of at least a dichroic coloring agent and a resin film.

Resin

As a resin film used for the polarizer, polyvinyl alcohol (PVA) film is widely used, and it is preferable to use PVA film also in the present invention. The PVA film generally occupies 80% by mass or more of the polarizer. The PVA used as a raw material for the PVA film is normally a component obtained by saponification of polyvinyl acetate, but for example, a component capable of copolymerizing with vinyl acetate such as unsaturated carboxylic acid, unsaturated sulfonic acid, olefins, and vinyl ethers may be included. In addition, a modified PVA including an acetoacetyl group, a sulfo group, a carboxyl group, or an oxyalkylene group can also be used.

A degree of saponification of the PVA is not particularly limited, and is preferably 80 to 100 mol %, and particularly preferably 90 to 100 mol %, from a viewpoint of solubility and the like. In addition, a polymerization degree of the PVA is not particularly limited and is preferably 1,000 to 10,000 and particularly preferably 1,500 to 5,000.
A modulus of elasticity of the PVA film before being stretched is preferably 0.1 MPa to 500 MPa and more preferably 1 MPa to 100 MPa, in terms of a Young's modulus.
By adopting such a PVA film having such a modulus of elasticity, occurrence of wrinkles after stretching is suppressed, and therefore a PVA film having sufficient strength even after stretching can be manufactured.
The thickness of the PVA film before being stretched is not particularly limited and is preferably 1 μm to 1 mm and particularly preferably 20 to 200 μm, from viewpoints of stability of film storage and uniform stretching. In addition, the thickness of the PVA film after being stretched is preferably 2 to 100 μm and more preferably 7 to 25 μm, from a viewpoint of improvement of light leakage.

Dichroic Coloring Agent

The dichroic coloring agent contained in the polarizer is a coloring agent having different absorbency depending on a direction, and examples thereof include iodide ion, a diazo-based coloring agent, a quinone-based coloring agent, other known dichroic dye, and the like. As the dichroic coloring agent, a high-order iodide ion such as $I_3^-$ and $I_5^-$ and dichroic dye can be preferably used.
Among these, the high-order iodide ion is particularly preferably used. The high-order iodide ion can be generated in a state in which the PVA film is immersed in a solution obtained by dissolving iodine in a potassium iodide aqueous solution and/or a boric acid aqueous solution, so that adsorption and alignment are performed in the PVA film, as disclosed in "Application of polarizing plate", written by Ryo Nagata, CMC publishing and industrial materials, Vol. 28, No. 7, p. 39 to p. 45. A multimer such as a dimer of these polyiodide ions and/or a polyiodide ion having a higher valence number may be contained.
The content of the dichroic coloring agent contained in the polarizer is preferably 0.1 to 50 parts by mass, more preferably 0.5 to 20 parts by mass, and still more preferably 1.0 to 5.0 parts by mass, with respect to 100 parts by mass of the resin film.
The polarizer of the present invention may include, if necessary, a plasticizer and a surfactant, in addition to the resin film and the dichroic coloring agent.

Manufacturing of Polarizer

The polarizer can be manufactured by general methods. For example, the polarizer can be manufactured by converting PVA into a film and then introducing a dichroic coloring agent such as iodine. The PVA film can be manufactured with reference to the descriptions of paragraphs 0213 to 0237 of JP2007-86748A, JP3342516B, JP1997-328593A (JP-H09-328593A), JP2001-302817A, JP2002-144401A, and the like.
A more preferable aspect of manufacturing the polarizer includes step (1) of preparing a PVA film, step (2) of stretching the PVA film, step (3) of dyeing the stretched PVA film using a dichroic coloring agent, and step (4) of boric acid crosslinking, of the PVA film after dyeing. Preferable embodiments of each of the above steps will be described below, but the present invention is not limited thereto.

Step (1)

PVA is added to an aqueous medium while stirring so as to prepare a stock solution in which PVA is dissolved. A concentration of PVA in the stock solution is preferably 5% to 20% by mass. Alternatively, the obtained stock solution is dehydrated and a PVA wet cake having a moisture content of about 40% may be prepared once. In a case of further adding additives thereafter, for example, it is preferable that the PVA wet cake is input in a dissolver, an additive and water are added thereto, and the mixture is stirred while blowing water vapor from the bottom of the dissolver. The inner resin temperature is preferably heated to 50° C. to 150° C. and the inner portion of the system may be pressurized.

Next, the stock solution is cast to form a film. The method of casting is not particularly limited, and a method of supplying the heated stock solution to a biaxial extruder and casting the stock solution on a support from discharge means (preferably a die and more preferably a T-shaped slit die) by a gear pump, is preferable. In addition, the temperature of the resin solution discharged from the die is not particularly limited.

As the support, a cast drum is preferable, and a diameter, a width, a rotation rate, and a surface temperature of the drum are not particularly limited. Among these, the diameter of the cast drum is preferably 2,000 to 5,000 mm, more preferably 2,500 to 4,500 mm, and particularly preferably 3,000 to 3,500 mm.

The width of the cast drum is preferably 2 to 6 m, more preferably 3 to 5 m, and particularly preferably 4 to 5 m.

The rotation rate of the cast drum is preferably 2 to 20 m/min, more preferably 4 to 12 m/min, and particularly preferably 5 to 10 m/min.

The cast drum surface temperature of the cast drum is preferably 40° C. to 140° C., more preferably 60° C. to 120° C. and particularly preferably 80° C. to 100° C.

The resin temperature of the T-shaped slit die outlet is preferably 40° C. to 140° C., more preferably 60° C. to 120° C., and particularly preferably 80° C. to 100° C.

Thereafter, it is preferable that a rear surface and a front surface of the obtained roll alternatively pass through a drying roll so as to be dried. A diameter, a width, a rotation rate, and a surface temperature of the drying roll are not particularly limited. Among these, the diameter of the cast drum is preferably 200 to 450 mm, more preferably 250 to 400 mm, and particularly preferably 300 to 350 mm.

In addition, a length of the obtained film is not particularly limited, and an elongated film having a length of 2,000 m or more, preferably 4,000 m or more can be obtained. A width of the obtained film is also not particularly limited, and is preferably 2 to 6 m and more preferably 3 to 5 m.

Step (2)

In the stretching, vertical monoaxial stretching method as disclosed in U.S. Pat. No. 2,454,515A or a tenter method as disclosed in JP2002-86554A can be preferably used. A preferred stretching ratio is 2 times to 12 times, and more preferably 3 times to 10 times.

Step (3)

Dyeing of the PVA film by the dichroic coloring agent after stretching is carried out by gas-phase or liquid-phase adsorption. In a case of using iodine as the dichroic coloring agent, for example, the dyeing can be performed by immersing a polymer film for a polarizer in an aqueous solution of iodine-potassium iodide (dyeing solution). In this aqueous solution, the mass of iodine is 0.1 to 20 g/L, the mass of potassium iodide is 1 to 200 g/L, and the mass ratio of iodine and potassium iodide is preferably 1 to 200. The dyeing time is preferably 10 to 5,000 seconds and the liquid temperature is preferably 5° C. to 60° C. In addition, dyeing can also be carried out by coating or spraying iodine or a dyeing solution on a PVA film.

In the above description, it is explained that step (3) is carried out after step (2), but this order may be interchanged. That is, an aspect in which dyeing of step (3) is carried out after step (1) and then stretching of step (2) is performed, is also preferable.

Step (4)

The boric acid crosslinking of the PVA film can be carried out by general methods. In addition, as disclosed in JP3145747B, the PVA film can be crosslinked with boric acid by adding a boron-based compound such as boric acid or borax into a dyeing solution. By forming a crosslinked structure in the PVA film, it becomes possible to stably maintain the dichroic coloring agent in the PVA film.

As other steps, a swelling step, a film hardening step, and a drying step may be performed, for example. These steps are disclosed in paragraphs 0039 to 0050 of JP2011-237580A and the contents which of are incorporated in the present specification.

Shape and Configuration of Polarizing Plate

A shape of the polarizing plate of the present invention includes a shape of a polarizing plate which is manufactured to have an elongated shape and is wound up in a roll shape (for example, an aspect in which a roll length is 2,500 m or more or an aspect in which a roll length is 3,900 m or more) by the continuous production, in addition to a shape of a polarizing plate having an aspect of a film piece which is cut in a size capable of being incorporated into a display device as itself. In order to be used for a large-screen liquid crystal display device, a width of the polarizing plate is preferably 1,470 mm or more.

It is also preferable that the polarizing plate of the present invention is formed such that a protection film is bonded to one protective film and a separate film is bonded to the other protective film.

The protection film and the separate film are used for protecting the polarizing plate at the time of delivery polarizing plate, inspection of products, and the like. In this case, the protection film is bonded for protecting the surface of the polarizing plate and is used on the surface side opposite to the surface of the polarizing plate which is bonded to a liquid crystal plate. In addition, the separate film is used for covering an adhesive layer bonded to the liquid crystal plate and is used on the surface side of the polarizing plate which is bonded to the liquid crystal plate.

Manufacture of Polarizing Plate (Laminating Method of Polarizer and Polarizing Plate Protective Film)

The polarizing plate of the present invention can be obtained by laminating at least one polarizing plate protective film of the present invention on at least one side of the polarizer.

It is preferable that the surface to be bonded to the polarizer, of the polarizing plate protective film is subjected to an alkali treatment in advance, and the polarizer is bonded using a fully saponified PVA aqueous solution as an adhesive, and therefore the polarizing plate protective film is produced.

Examples of the adhesive used for bonding the treated surface of the polarizing plate protective film and the polarizer to each other include a vinyl-based latex such as butyl acrylate, and the like, in addition to the fully saponified PVA aqueous solution.

In a case of bonding the polarizing plate protective film of the present invention to the polarizer, it is preferable to perform the bonding so that a transmission axis of the polarizer and a slow axis of the polarizing plate protective film are orthogonal, parallel to each other or form 45°.

The parallel and orthogonal states include a range of errors allowed in the technical field of the present invention. For example, the above description means that the error is in a range of less than ±10° from an exact angle relative to the parallel and orthogonal states and the error from the exact angle is preferably 5° or smaller and more preferably 3° or smaller.

The state in which the transmission is of the polarizer and the slow axis of the polarizing plate protective film are parallel to each other means that a direction of a main refractive index nx of the polarizing plate protective film and a direction of the transmission axis of the polarizer intersect each other by an angle of ±10°. This angle is preferably within 5°, more preferably within 3°, still more preferably within 1°, and most preferably within 0.5°.

In addition, the state in which the transmission axis of the polarizer and the slow axis of the polarizing plate protective film are orthogonal to each other means that a direction of a main refractive nx of the polarizing plate protective film and a direction of the transmission axis of the polarizing plate intersect each other by an angle of 90°±10°. This angle is preferably 90°±5°, more preferably 90°±3°, still more preferably 90°±1°, and most preferably 90°±0.1°. It is preferable that the angle is set in the range described above, because a deterioration in performance of a degree of polarization under the presence of crossed nicols of the polarizing plate is suppressed and light leakage is decreased.

Functionalization of Polarizing Plate

The polarizing plate of the present invention is also preferably used as a functionalized polarizing plate by combining with a polarizing plate protective film having a functional layer such as an antireflection layer, a luminance improving layer, a forward scattering layer and an antiglare layer, which are for improving visibility of a display. The antireflection layer and the luminance improving layer, other functional optical films, the forward scattering layer, and the antiglare layer for functionalization are disclosed in paragraphs 0257 to 0276 of JP2007-86748A, and a polarizing plate functionalized based on these descriptions can be produced.

Performance of Polarizing Plate

Degree of Polarization

A degree of polarization of the polarizing plate of the present invention is preferably 95.0% or greater, more preferably 98% or greater, and most preferably 99.5% or greater.

In the present invention, the degree of polarization of the polarizing plate can be acquired by calculating polarization degree spectra by the following expression from an orthogonal transmittance and a parallel transmittance measured in a wavelength range of 380 nm to 700 nm by using an automatic polarizing film measurement device VAP-7070 manufactured by JASCO Corporation, and calculating a weighting average of a light source (auxiliary illuminant C) and CIE visibility (Y).

Degree of polarization (%)={(parallel transmittance−orthogonal transmittance)/(parallel transmittance+orthogonal transmittance)}$^{1/2}$×100

Change in Degree of Polarization

The polarizing plate of the present is unlikely to deteriorate in optical performance even under moist heat conditions and has excellent durability.

The polarizing plate of the present invention preferably has a change in degree of polarization of less than 12% in a case of being stored for 120 hours under environments of 85° C. and a relative humidity of 85%. The degree of polarization is measured by the method described in examples to be described below.

Other Properties

Other preferable optical properties and the like of the polarizing plate of the present invention are disclosed in paragraphs 0238 to 0255 of JP2007-086748A and it is preferable that these properties are satisfied.

Image Display Device

The polarizing plate of the present invention is preferably used for an image display device. Examples of such an image display device include a liquid crystal display device and an organic electroluminescence display device. In a case of being used in the organic electroluminescence display device, the polarizing plate is used for antireflection applications, for example. In particular, the polarizing plate of the present invention is suitably used for a liquid crystal display device.

Liquid Crystal Display Device

A liquid crystal display device as one embodiment of the image display device of the present invention includes liquid crystal cells and the polarizing plate of the present invention disposed in at least one liquid crystal cell.

Preferable embodiments of the liquid crystal display device will be described.

FIG. 1 is a schematic diagram showing one embodiment of the liquid crystal display device. In FIG. 1, a liquid crystal display device 10 includes a liquid crystal layer 5; a liquid crystal cell having an electrode substrate 3 on the liquid crystal cell and an electrode substrate 6 below the liquid crystal cell which are respectively disposed above and below the liquid crystal layer; and an upper side polarizing plate 1 and a lower side polarizing plate 8 which are disposed on both sides of the liquid crystal cell. A color filter may be disposed between the liquid crystal cell and each polarizing plate. In a case of using the liquid crystal display device 10 as a transmissive type, a backlight including a cold cathode or hot cathode fluorescent tube, or a light emitting diode, a field emission element, or an electroluminescent element as a light source is disposed on a rear surface. A substrate of the liquid crystal cell generally has a thickness of 50 μm to 2 mm.

Each of the upper side polarizing plate 1 and the lower side polarizing plate 8 generally has a lamination configuration in which a polarizer is sandwiched between two polarizing plate protective films. In the liquid crystal display device 10 of the present invention, it is preferable that at least one of the polarizing plates is the polarizing plate of the present invention. In the liquid crystal display device 10 of the present invention, it is preferable that cellulose ester film of the present invention as the polarizing plate protective film, the polarizer, and a general transparent protective film are laminated in this order from the outer side of the device (side far from the liquid crystal cell). A substrate of the liquid crystal cell generally has a thickness of 50 μm to 2 mm.

Types of Liquid Crystal Display Device

The cellulose ester film of the present invention can be used for liquid crystal cells of various display modes. Various display modes such as TN (Twisted Nematic), IPS (In-Plane Switching), FLC (Ferroelectric Liquid Crystal), AFLC (Anti-ferroelectric Liquid Crystal), OCB (Optically Compensatory Bend), STN (Super Twisted Nematic), VA (Vertically Aligned), ECB (Electrically Controlled Birefringence), and HAN (Hybrid Aligned Nematic) have been proposed. In addition, a display mode in which alignment division is performed with respect to the display modes has also been proposed. The cellulose ester film of the present invention can be suitably used in any display mode of the liquid crystal display device by taking the retardation required for the driving mode of the liquid crystal cell and the like into the consideration. In addition, the cellulose ester film can also be suitably used for any liquid crystal display devices of a transmissive type, a reflective type, and a semi-transmission type.

EXAMPLES

The present invention will be explained in more detail based on examples, but the present invention is not limited to the following examples.

Manufacturing Example: Production of Polarizing Plate

Production of Polarizing Plate Protective Film 101

Preparation of Cellulose Acylate Solution 101

Each of the following components was put in a mixing tank and stirred so as to become a solution, and therefore a cellulose acylate solution 101 was prepared.

Composition of Cellulose Acylate Solution 101

| | |
|---|---|
| Cellulose acetate having an acetyl substitution degree of 2.87 | 100.0 parts by mass |
| Film durability improving agent (Compound 1-1) | 0.5 parts by mass |
| Methylene chloride solvent) | 389.0 parts by mass |
| Methanol (second solvent) | 58.2 parts by mass |

Preparation of Matting Agent Solution 102

Each of the following components was put in a disperser and stirred so as to become a solution, and therefore a matting agent solution 102 was prepared.

Composition of Matting Agent Solution 102

| | |
|---|---|
| Silica particles having an average particle size of 20 nm (AEROSIL R972 manufactured by Nippon Aerosil co. Ltd.) | 2.0 parts by mass |
| Methylene chloride (first solvent) | 75.5 parts by mass |
| Methanol (second solvent) | 11.3 parts by mass |
| Cellulose acylate solution 101 | 0.9 parts by mass |

Casting 1.3 parts by mass of the matting agent solution 102 and 98.7 parts by mass of the cellulose acylate solution 101 were mixed using an in-line mixer, and therefore a resin solution (dope) was prepared. The prepared dope was casted on a stainless steel casting support (support temperature of 22° C.) by using a band casting machine. When the amount of solvent remaining in the dope became approximately 20% by mass, a formed film was stripped. Both ends of the stripped film in a width direction were grasped with a tenter, and the film in a state where the amount of residual solvent was 5% to 10% by mass was dried while being stretched 1.10 times (10%) in a width direction at the temperature of 120° C. The amount of residual solvent was determined by cutting out a sample from the casting support, dissolving the sample in chloroform, and measuring the amount of methylene chloride by gas chromatography.

Thereafter, the film was handled between the rolls of a thermal treatment device so as to be further dried, and therefore a polarizing plate protective film 101 of the present invention was obtained. The thickness of the polarizing plate protective film 101 obtained was 25 μm, the width thereof was 1,480 nm, and the winding length thereof was 2,700 m.

Production of Polarizing Plate Protective Films 102 to 117 and c01 to c09

Polarizing plate protective films 102 to 117 and comparative polarizing plate protective films c01 to c09 of the present invention were produced in the same manner as that of the polarizing plate protective film 101, except that in the polarizing plate protective film 101, the type or an addition amount of the film durability improving agent in the cellulose acylate solution 101 was changed as described in the following table (the addition amounts shown in the following table are addition amounts (parts by mass) with respect to 100 parts by mass of cellulose acetate), and a barbituric acid compound or an acetal compound shown in Table 1 was added.

Production of Cellulose Acylate Film S01

Preparation of Cellulose Acylate Solution 103

Each of the following components was put in a mixing tank and stirred so as to become a solution, and therefore a cellulose acylate solution 103 was prepared.

Composition of Cellulose Acylate Solution 103

| | |
|---|---|
| Cellulose acetate having an acetyl substitution degree of 2.87 | 100.0 parts by mass |
| Additive E-1 | 8.0 parts by mass |
| SEESORB706 (trade name) manufactured by Shipro Kasei Kaisha, Ltd. | 4.0 parts by mass |

| | |
|---|---|
| Methylene chloride (first solvent) | 389.0 parts by mass |
| Methanol (second solvent) | 58.2 parts by mass |

Additive E-1

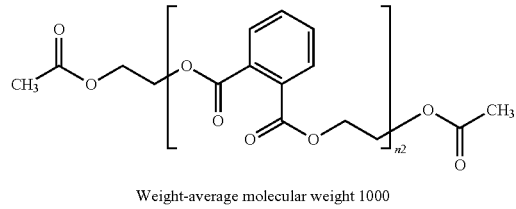

Weight-average molecular weight 1000
n2: about 4.5

Preparation of Matting Agent Solution 104

Each of the following components was put in a disperser and stirred so as to become a solution, and therefore a matting agent solution 104 was prepared.

Composition of Matting Agent Solution 104

| | |
|---|---|
| Silica particles having an average particle size of 20 nm (AEROSIL R972 manufactured by Nippon Aerosil co. Ltd.) | 2.0 parts by mass |
| Methylene chloride (first solvent) | 75.5 parts by mass |
| Methanol (second solvent) | 11.3 parts by mass |
| Cellulose acylate solution 103 | 0.9 parts by mass |

Preparation of Barbituric Acid-Based Additive Solution 105

The following composition was put in a mixing tank and stirred while heating to dissolve each component, and therefore a barbituric acid-based additive solution 105 was prepared.

Composition of Barbituric Acid-Based Additive Solution 105

| | |
|---|---|
| Compound A-3 | 20.0 parts by mass |
| Methylene chloride solvent) | 69.6 parts by mass |
| Methanol (second solvent) | 10.4 parts by mass |

Casting 1.3 parts by mass of the matting agent solution 104, 3.4 parts by mass of the barbituric acid-based additive solution 105 were respectively filtered and mixed with each other with an in-line mixer, 95:3 parts by mass of the cellulose acylate solution 103 was added thereto and mixed with each other with the in-line mixer, and therefore a resin solution (dope) was prepared. The prepared dope was casted on a stainless steel casting support (support temperature of 22° C.) by using a band casting machine. When the amount of solvent remaining in the dope become approximately 20% by mass, a formed film was stripped. Both ends of the stripped film in a width direction were grasped with a tenter, and the film in a state where the amount of residual solvent was 5% to 10% by mass was dried while being stretched 1.15 times (15%) in a width direction at the temperature of 120° C. Thereafter, the film was handled between the rolls of a thermal treatment device so as to be further dried, and therefore a cellulose acylate film S01 was obtained. A thickness of the cellulose acylate film S01 obtained was 25 µm, the width thereof was 1,480 mm, and the winding length thereof was 2,700 m.

Production of Polarizer

An aqueous solution obtained by dissolving polyvinyl alcohol (PVA) powder having an average degree of polymerization of 2,400 and a degree of saponification of 99.9% or greater in pure water so as to adjust a concentration to be 10% by mass, was applied onto a polyester film, dried at 40° C. for 3 hours, and then further dried at 110° C. for 60 minutes, and therefore a PVA film having a thickness of 32 µm was obtained. The obtained film was swelled in 30° C. warm water for 1 minute and immersed in a 30° C. aqueous solution of potassium iodide/iodine (mass ratio 10:1) and subjected to vertical monoaxial stretching by 1.5 times. Regarding the concentration of the aqueous solution of potassium iodide/iodine (mass ratio 10:1), the concentration of iodine was 0.38% by mass. Next, vertical monoaxial stretching was performed in a 50° C. boric acid aqueous solution having a concentration of 4.25% by mass so that the total stretching ratio became 7 times, the film was immersed in a 30° C. water bath so as to be washed and dried at 50° C. for 4 minutes, and therefore a polarizer having a thickness of 8 µm was obtained.

Saponification Treatment of Polarizing Plate Protective Film (Cellulose Acylate Film)

Each of the polarizing plate protective films 101 to 117 and c01 to c09, and the cellulose acylate film S01 produced as described above was immersed in a sodium hydroxide aqueous solution having a concentration of 2.3 mol/L at 55° C. for 3 minutes. Thereafter, the film was washed in a water washing bath at room temperature (25° C.) and neutralized with sulfuric acid having a concentration of 0.05 mol/L at 30° C. The film was washed again in a water washing bath at room temperature (25° C.) and then dried over 100° C. hot air. As above, the saponification treatment of the film surface was performed with respect to each of the polarizing plate protective films 101 to 117 and c01 to c09, and the cellulose acylate film S01.

Preparation of Polarizing Plate H01

The saponified polarizing plate protective film 101 was bonded to one side of the polarizer manufactured as described above, by using a polyvinyl alcohol-based adhesive. In addition, the saponified cellulose acylate film S01 was bonded to the side opposite to the polarizing plate protective film 101 so that the polarizer is sandwiched therebetween. In this case, the disposition was performed such that a transmission axis of the polarizer and a width direction of the polarizing plate protective film or the cellulose acylate film which was produced became parallel to each other.

As above, a polarizing plate H01 of the present invention was produced.

Preparation of Polarizing Plates H02 to H17 and Hc1 to Hc9

The polarizing plates H02 to H17 of the present invention and comparative polarizing plates Hc1 to Hc9 were prepared in the same manner as in the production of the polarizing plate H01, except that in the production of the polarizing plate H01, the polarizing plate protective film and the cellulose acylate film were changed as shown in the following table.

Test Example 1

Durability Test on Polarizing Plate Protective Film

Change in Molecular Weight

A weight-average molecular weight of each polarizing plate protective film produced as above was measured by performance liquid chromatography under the following measurement conditions.

Measurement Condition

Solvent: NMP: Wako Pure Chemical Industries, Ltd. 138-12103 (LiBr 10 mM; manufactured by Kojundo Chemical Laboratory Co., Ltd.)
Column: three TSKgel Super AWM-H (manufactured by TOSOH CORPORATION)
Sample Concentration: 0.1% by mass
Detector: RI MODEL 504 (manufactured by GL Sciences Inc.)
Flow Rate: 10 mL/min
Calibration Curve: STK standard polystyrene (Mw=500 to 1,000,000, manufactured by TOSOH CORPORATION)
Column Temperature: 40° C.

A weight-average molecular weight immediately after film formation was set as Mw (before), and a weight-average molecular weight of the sample after being stored for 14 days under the environments of 90° C. and a relative humidity 90% was set as Mw (after), and durability evaluation on the polarizing plate protective film was performed based on the following evaluation standard using ΔMw calculated in the following expression as an indicator. As ΔMw becomes small, the film durability becomes excellent.

$$\Delta Mw = 1 - Mw(\text{after})/Mw(\text{before})$$

Evaluation Standard of Change in Molecular Weight

AA: ΔMw is less than 0.01
A: ΔMw is 0.01 or more and less than 0.02
B: ΔMw is 0.02 or more and less than 0.03
C: ΔMw is 0.03 or more and less than 0.05
D: ΔMw is 0.05 or more
The results are shown in the table below.

Tint Change

With respect to the polarizing, plate protective films produced as above, b* was measured using a spectrophotometer UV-3150 (manufactured by Shimadzu Corporation) according to JIS Z 8781. A measurement value immediately after film formation was set as b* (before), and a measurement value after storage for 14 days under the environments of 90° C. and a relative humidity 90% was set as b* (after), and durability evaluation on the polarizing plate protective film was performed based on the following evaluation standard using Δb* calculated in the following expression as an indicator. As Δb* becomes small, the durability becomes excellent.

The evaluation was performed according to the following standard with Δb*=b* (after)−b* (before).

Evaluation Standard of Tint Change

AA: Δb* is less than 0.05
A: Δb* is 0.05 or more and less than 0.1
B: Δb* is 0.1 or more and less than 0.3
C: Δb* is 0.3 or more and less than 0.6
D: Δb* is 0.6 or more
The results are shown in the table below.

Test Example 2

Durability Test on Polarizing Plate

Regarding each polarizing plate produced as described above, the orthogonal transmittance and the parallel transmittance were measured by using automatic polarizing film measurement device VAP-7070 (trade name) manufactured by JASCO Corporation, and a degree of polarization was calculated by the following expression.

$$\text{Degree of polarization (\%)} = \{(\text{parallel transmittance} - \text{orthogonal transmittance})/(\text{parallel transmittance} + \text{orthogonal transmittance})\}^{1/2} \times 100$$

A sample (5 cm×5 cm) obtained by bonding the polarizing plate onto a glass plate through a pressure sensitive adhesive was produced. In this case, the cellulose acylate film S01 was bonded to a side opposite to the glass (air interface side). The orthogonal transmittance and the parallel transmittance were measured by setting the glass side of this sample to face a light source.

Thereafter, the degree of polarization of the sample after being stored in the environments of a temperature of 85° C. and a relative humidity of 85% for 120 hours was measured in the same manner. An amount of a change in the degree of polarization before and after passage of time was obtained from the following; expression, and the durability of the polarizing plate was evaluated based on the following evaluation standard. As the change in the degree of polarization becomes small, the durability becomes excellent.

$$\text{Change in degree of polarization (\%)} = [\text{degree of polarization before storage (\%)} - \text{degree of polarization after storage (\%)}]$$

Evaluation Standard of Durability of Polarizing Plate

AA: A change in the degree of polarization is smaller than 1%
A: A change in the degree of polarization is 1% or greater and smaller than 5%
B: A change in the degree of polarization is 5% or greater and smaller than 12%
C: A change in the degree of polarization is 12% or greater and smaller than 20%
D: A change in the degree of polarization is 20% or greater The results are shown in the table below.

TABLE 2

| | Polarizing plate No. | No. | Polarizing plate protective film | | | | | | Evaluation | | |
|---|---|---|---|---|---|---|---|---|---|---|---|
| | | | Film durability improving agent | | Barbituric acid compound | | Acetal compound | | Film durability | | Polarizing Plate durability |
| | | | Type | Addition amount | Type | Addition amount | Type | Addition amount | Molecular weight change | Tint change | |
| Example 1 | H01 | 101 | Compound 1-1 | 0.5 | | | | | AA | AA | B |
| Example 2 | H02 | 102 | Compound 1-1 | 0.5 | Compound A-3 | 4 | | | AA | AA | A |
| Example 3 | H03 | 103 | Compound 1-1 | 0.5 | Compound A-3 | 4 | Compound D-2 | 5 | AA | AA | AA |
| Example 4 | H04 | 104 | Compound 1-2 | 0.5 | | | | | AA | A | B |
| Example 5 | H05 | 105 | Compound 1-2 | 0.5 | Compound A-3 | 4 | | | AA | A | A |
| Example 6 | H06 | 106 | Compound 1-2 | 0.5 | Compound A-3 | 4 | Compound D-2 | 5 | AA | A | AA |
| Example 7 | H07 | 107 | Compound 2-1 | 0.5 | | | | | A | A | B |
| Example 8 | H08 | 108 | Compound 2-1 | 0.5 | Compound A-3 | 4 | | | A | A | B |
| Example 9 | H09 | 109 | Compound 2-1 | 0.5 | Compound A-3 | 4 | Compound D-2 | 5 | A | A | A |
| Example 10 | H10 | 110 | Compound 3-1 | 0.5 | | | | | A | B | B |
| Example 11 | H11 | 111 | Compound 3-1 | 0.5 | Compound A-3 | 4 | | | A | B | B |
| Example 12 | H12 | 112 | Compound 3-1 | 0.5 | Compound A-3 | 4 | Compound D-2 | 5 | A | A | A |
| Example 13 | H13 | 113 | Compound 3-2 | 0.5 | | | | | A | A | B |
| Example 14 | H14 | 114 | Compound 3-2 | 0.5 | Compound A-3 | 4 | | | A | A | B |
| Example 15 | H15 | 115 | Compound 3-2 | 0.5 | Compound A-3 | 4 | Compound D-2 | 5 | A | A | A |
| Example 16 | H16 | 116 | Compound 1-1 | 0.2 | Compound A-3 | 4 | Compound D-2 | 5 | AA | AA | B |
| Example 17 | H17 | 117 | Compound 1-1 | 5 | Compound A-3 | 4 | Compound D-2 | 5 | AA | AA | A |
| Comparative Example 1 | Hc1 | C01 | | | | | | | D | D | C |
| Comparative Example 2 | Hc2 | C02 | Compound H-1 | 0.5 | | | | | B | B | D |
| Comparative Example 3 | Hc3 | C03 | Compound H-2 | 0.5 | | | | | A | B | C |
| Comparative Example 4 | Hc4 | C04 | Compound H-3 | 0.5 | | | | | B | B | D |
| Comparative Example 5 | Hc5 | C05 | Compound H-4 | 0.5 | | | | | B | B | C |
| Comparative Example 6 | Hc6 | C06 | Compound H-5 | 0.5 | | | | | A | A | D |
| Comparative Example 7 | Hc7 | C07 | Compound H-6 | 0.5 | | | | | D | D | C |
| Comparative Example 8 | Hc8 | C08 | | | Compound A-3 | 4 | | | C | C | A |
| Comparative Example 9 | Hc9 | C09 | | | | | Compound D-2 | 5 | C | C | A |

The compounds shown in Table 2 are as follows. In the following formulas, Me represents methyl and Ph represents phenyl. In addition, Compound 3-2 has a weight-average molecular weight of 3,000 to 4,000 and Compound H-2 has a weight-average molecular weight of 2,000 to 4,000. In addition, Compound H-1 is a commercially available epoxy compound: EPON 815C (manufactured by Momentive Specialty Chemicals Inc.).

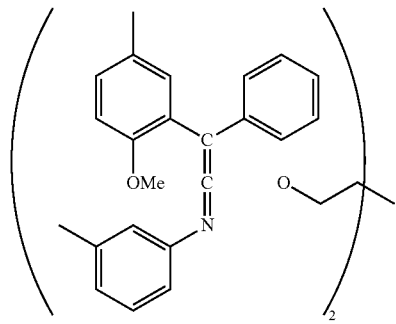

Compound 1-1

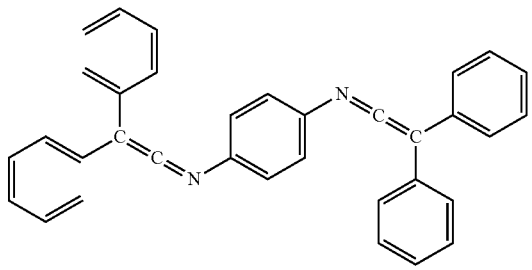

Compound 1-2

-continued
Compound 2-1
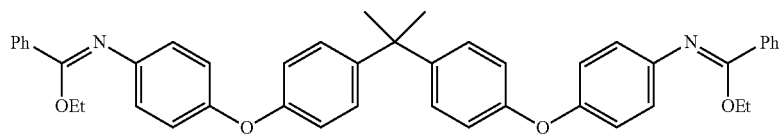
Compound 3-1
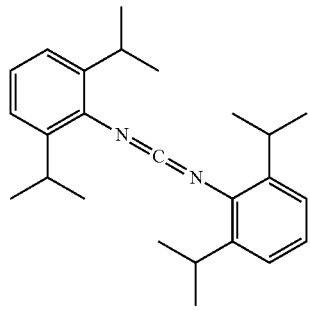
Compound 3-2
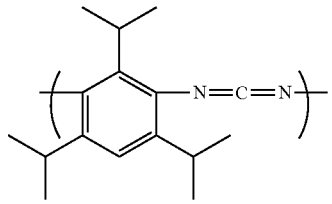
Compound A-3
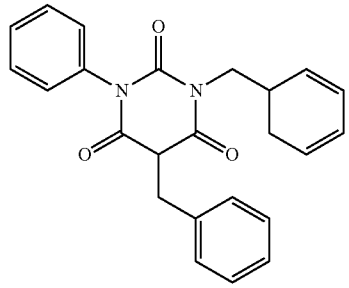
Compound D-2
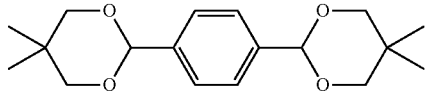
Compound H-1
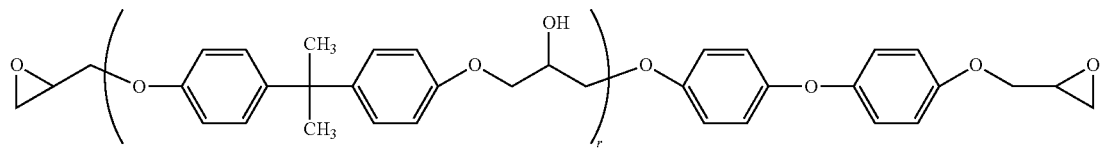
Compound H-2
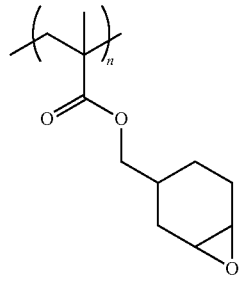
Compound H-3
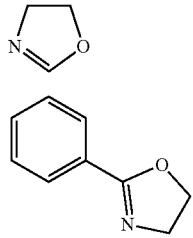
Compound H-4
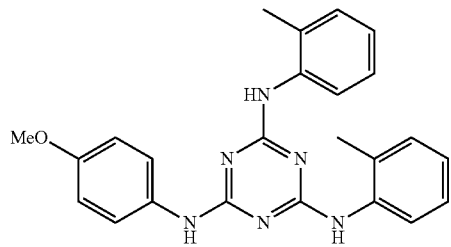
Compound H-5
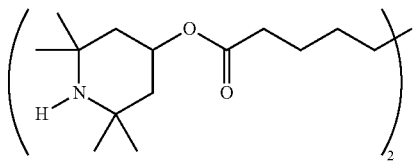

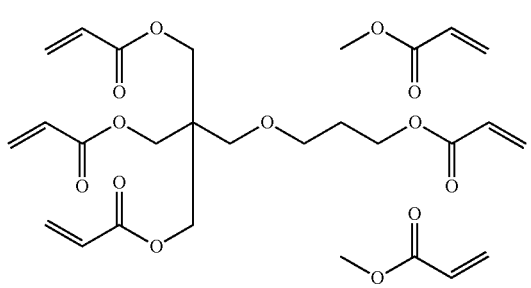

Compound H-6

As shown in Table 2, was found that in the polarising plate protective film not containing the film durability improving agent, cellulose acylate in the film was likely to be decomposed by the moist heat treatment and tint was likely to be changed (Comparative Examples 1, 8, and 9).

In addition, in the polarizing plate protective film containing an epoxy compound as a film durability improving agent, decomposition and tint change of cellulose acylate in the film were suppressed to some extent, but conversely, the durability of the polarizing plate tended to deteriorate (Comparative Examples 2 and 3).

In addition, also in a case where a compound having a structure in which the C=N structure is present as ring-constituting atoms of a monocyclic ring is used as a film durability improving agent, decomposition of cellulose acylate in the film cannot be sufficiently suppressed, leading to the result in which the durability of the polarizing plate using the cellulose acylate also deteriorates (Comparative Examples 4 and 5). In addition, even in a case where a known compound exhibiting an acid trapping action other than those described above was used, all of the film durability and the polarizing plate durability could not be increased to a desired level (Comparative Examples 6 and 7).

With respect to the above results, it was found that in the polarizing plate protective film containing any of the compounds represented by each formula of General Formulas (1) to (3) defined in the present invention, the decomposition of the cellulose acylate which is a main component is unlikely to occur, and tint of the protective film itself can be suppressed even under severe environments of high temperature and high humidity.

In addition, in the polarizing plate having the polarizing plate protective films, a deterioration in optical properties hardly occurred and excellent polarizing plate durability was exhibited even under high-temperature high-humidity environments. Furthermore, by using the compounds represented by any one of General Formulas (1) to (3) in combination with the barbituric acid compound represented by General Formula (A), it was shown that the durability of the polarizing plate can be further improved and that the tint change of the film or the durability of the polarizing plate can be highly enhanced by using an acetal compound in combination (Examples 1 to 17).

The present invention has been described based on the embodiments, but the present invention is not limited in any section of the description unless otherwise noted, and the present invention may be widely interpreted within a range not departing from a gist and a scope of the present invention shown in the accompanying claims.

The present application claims priority based on JP2016-010697A filed on Jan. 22, 2016, the content of which is incorporated as a part of the description of the present specification by reference.

EXPLANATION OF REFERENCES

1: upper side polarizing plate
2: absorption axis direction of upper side polarizing plate
3: electrode substrate on liquid crystal cell
5: liquid crystal layer
6: electrode substrate below liquid crystal cell
8: lower side polarizing plate
9: absorption axis direction of lower side polarizing plate
10: liquid crystal display device

What is claimed is:
1. A polarizing plate comprising:
a polarizer; and
a polarizing plate protective film laminated on the polarizer,
wherein the polarizing plate protective film contains at least one compound represented by any one of General Formulas (1) to (3), and cellulose acylate,

General Formula (1)

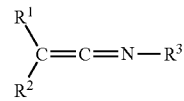

in General Formula (1), $R^1$ and $R^2$ represent an alkyl group, a cycloalkyl group, an aryl group, an acyl group, an alkoxy group, an aryl carbonyl group, or a carbamoyl group, and $R^3$ represents an alkyl group, a cycloalkyl group, or an aryl group, General Formula (2)

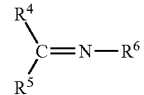

in General Formula (2), $R^4$ and $R^5$ represent an alkyl group, a cycloalkyl group, an aryl group, an acyl group, an alkoxy group, an aryl carbonyl group, or a carbamoyl group, and $R^6$ represents an alkyl group, a cycloalkyl group, or an aryl group, and

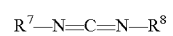 General Formula (3)

in General Formula (3), $R^7$ and $R^8$ represent an alkyl group, a cycloalkyl group, or an aryl group, provided that in each of General Formulas (1) to (3), a carbon atom and a nitrogen atom which are shown to be linked to each other by a double bond are not ring-constituting atoms of a monocyclic ring.

2. The polarizing plate according to claim 1,
wherein in the polarizing plate protective film, a content of the compound represented by any one of General Formulas (1) to (3) is a total of 0.1 to 50 parts by mass with respect to 100 parts by mass of a content of the cellulose acylate.

3. The polarizing plate according to claim 1,
wherein at least one of $R^1$, $R^2$, or $R^3$ of General Formula (1) is an aryl group, at least one of $R^4$, $R^5$, or $R^6$ of General Formula (2) is an aryl group, and at least one of $R^7$ or $R^8$ of General Formula (3) is an aryl group.

4. The polarizing plate according to claim 3,
wherein at least two of $R^1$, $R^2$, or $R^3$ of General Formula (1) are aryl groups, at least two of $R^4$, $R^5$, or $R^6$ of General Formula (2) are aryl groups, and $R^7$ and $R^8$ of General Formula (3) are aryl groups.

5. The polarizing plate according to claim 3,
wherein the aryl group is a phenyl group.

6. The polarizing plate according to claim 1,
wherein the compound represented by any one of General Formulas (1) to (3) has a molecular weight of 250 or more.

7. The polarizing plate according to claim 1,
wherein the polarizing plate protective film contains at least one compound represented by General Formula (A),

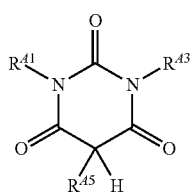

General Formula (A)

in General Formula (A), $R^{41}$ and $R^{43}$ represent a hydrogen atom, an alkyl group, a cycloalkyl group, an alkenyl group, or an aromatic group, and $R^{45}$ represents a hydrogen atom or a substituent.

8. The polarizing plate according to claim 1,
wherein the polarizing plate protective film contains at least one compound represented by General Formula (I) or (II),

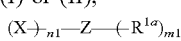

General Formula (I)

in General Formula (I), Z represents a benzene ring or a cyclohexane ring, X represents a group represented by General Formula (I-A-3), n1 is an integer of 2 to 6, $R^{1a}$ represents a substituent, and m1 is an integer of 0 to 4,

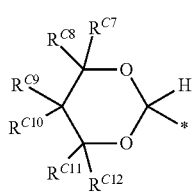

General Formula (I-A-3)

in General Formula (I-A-3), $R^{C7}$ to $R^{C12}$ represent a hydrogen atom, an alkyl group, a cycloalkyl group, an aryl group, an acyl group, an aryl carbonyl group, an alkoxy group, or an alkoxycarbonyl group, and * represents a bond, and

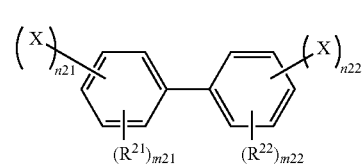

General Formula (II)

in General Formula (II), X has the same meaning as X in General Formula (I), n21 and n22 are integers of 1 to 5, $R^{21}$ and $R^{22}$ represent substituents, and m21 and m22 are integers of 0 to 4.

9. An image display device comprising:
the polarizing plate according to claim 1.

10. A polarizing plate protective film comprising:
at least one compound represented by any one of General Formulas (1) to (3); and
cellulose acylate,

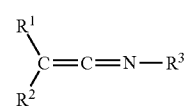

General Formula (1)

in General Formula (1), $R^1$ and $R^2$ represent an alkyl group, a cycloalkyl group, an aryl group, an acyl group, an alkoxy group, an aryl carbonyl group, or a carbamoyl group, and $R^3$ represents an alkyl group, a cycloalkyl group, or an aryl group,

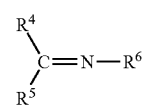

General Formula (2)

in General Formula (2), $R^4$ and $R^5$ represent an alkyl group, a cycloalkyl group, an aryl group, an acyl group, an alkoxy group, an aryl carbonyl group, or a carbamoyl group, and $R^6$ represents an alkyl group, a cycloalkyl group, or an aryl group, and

General Formula (3)

in General Formula (3), $R^7$ and $R^8$ represent an alkyl group, a cycloalkyl group, or an aryl group, provided that in each of General Formulas (1) to (3), a carbon atom and a nitrogen atom which are shown to be linked to each other by a double bond are not ring-constituting atoms of a monocyclic ring.

\* \* \* \* \*